US007322691B2

(12) United States Patent
Xie

(10) Patent No.: US 7,322,691 B2
(45) Date of Patent: Jan. 29, 2008

(54) DETACHABLE AUXILIARY FRAME FOR SPECTACLES

(76) Inventor: Yiling Xie, 1009 Arcadia Ave., Suite 3, Arcadia, CA (US) 91007

( * ) Notice: Subject to any disclaimer, the term of this patent is extended or adjusted under 35 U.S.C. 154(b) by 0 days.

(21) Appl. No.: 11/251,461

(22) Filed: Oct. 14, 2005

(65) Prior Publication Data

US 2006/0055867 A1 Mar. 16, 2006

Related U.S. Application Data

(63) Continuation-in-part of application No. 11/109,234, filed on Apr. 18, 2005, now Pat. No. 7,249,841, which is a continuation-in-part of application No. 10/934,020, filed on Sep. 2, 2004, now Pat. No. 7,152,974.

(51) Int. Cl.
*G02C 7/08* (2006.01)
(52) U.S. Cl. .......................................... 351/57; 351/47
(58) Field of Classification Search ................. 351/47, 351/48, 57, 58
See application file for complete search history.

(56) References Cited

U.S. PATENT DOCUMENTS

| 6,264,323 | B1 * | 7/2001 | Chao | 351/47 |
| 6,959,987 | B2 * | 11/2005 | Kim et al. | 351/47 |
| 7,055,950 | B2 * | 6/2006 | Fukuwa | 351/47 |
| 2004/0239872 | A1 * | 12/2004 | Chow | 351/47 |

* cited by examiner

*Primary Examiner*—Huy Mai
(74) *Attorney, Agent, or Firm*—Raymond Y. Chan; David and Raymond Patent Firm

(57) ABSTRACT

A spectacles set includes a primary spectacles and a detachable shelter frame. The primary spectacles includes two lenses, a primary bridge extended between two inner sides of the lenses respectively. The detachable shelter frame includes two shelter lenses, a shelter bridge extended between two inner sides of the shelter lenses, and a mounting arrangement comprising first through second supporting members spacedly and rearwardly extended from the shelter bridge to engage on the primary bridge so as to support the detachable shelter frame with at least two point supports.

5 Claims, 34 Drawing Sheets

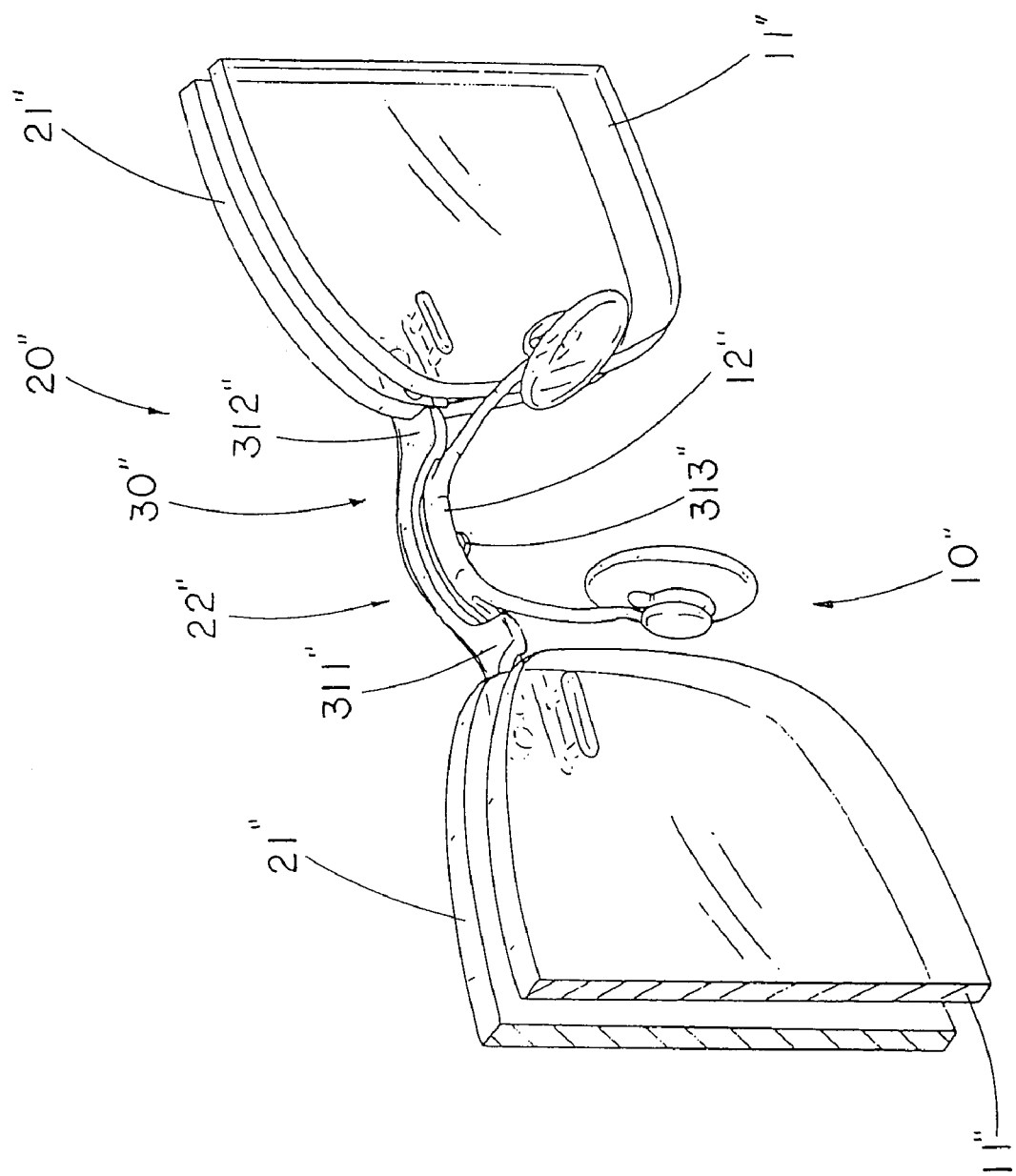

DETACHABLE AUXILIARY FRAME FOR SPECTACLES

CROSS REFERENCE OF RELATED APPLICATION

This is a Continuation-In-Part application of a non-provisional application, application Ser. No. 11/109,234, filed on Apr. 18, 2005 now U.S. Pat. No. 7,249,841, which is a Continuation-In-Part application of another non-provisional application, application Ser. No. 10/934,020, filed on Sep. 2, 2004 now U.S. Pat. No. 7,152,974.

BACKGROUND OF THE PRESENT INVENTION

1. Field of Invention

The present invention relates to spectacles, and more particularly to a spectacles set, wherein a mounting arrangement of a detachable shelter frame is arranged to provide a point support and a surface support for securely mounting the detachable shelter frame in front of a primary spectacles in a detachably attaching manner so as to enhance the mounting operation of the detachable shelter frame.

2. Description of Related Arts

Shelter frames are widely used today. A conventional shelter frame such as dip-on sunglasses comprises a plurality of clipping claws protruded around the pair of lens frames for detachably mounting on shortsighted or farsighted sunglasses so that the wearer does not need to carry and pay for another pair of shortsighted or farsighted sunglasses. However, the metal made clipping claws may scratch the lenses or the lens frames of the primary eyeglasses during the mounting process. Also, the wearer requires both hands to align and engage the conventional clip-on sunglasses on the primary eyeglasses in correct position. It is troublesome and dangerous for a wearer to use his or her both hands to wear such clip-on sunglasses on the regular glasses while he or she is driving.

In order to solve the problems of the above mentioned clip-on sunglasses, magnetic attachment is recently introduced into the eyeglasses industry. A primary pair of magnet members is affixed on two upper side extensions of a primary spectacles frame respectively. An shelter frame such as a sunglasses includes a pair of arms for resting over the upper side extensions for preventing the shelter frame from moving downward relative to the primary spectacles frame and an auxiliary pair of magnet members connected to the arms respectively for engaging with the primary magnet members of the primary spectacles frame so as to stably attach the shelter frame to the primary spectacles frame. However, the users have to align two pairs of magnet members. If the auxiliary magnet members of the sunglasses are misaligned with the primary magnet members of the primary spectacles frame, the sunglass will fall down from the primary spectacles frame easily.

Thus, the major drawback of the eyeglasses equipped with the magnet attachment is that the primary spectacles frame needs to be altered its original structural design in order to affix the magnet members thereon. So, the wearer may have to buy a pair of spectacles frames including a primary eyeglasses and an auxiliary sunglasses, which is much expensive than that the wearer needs to buy the clip-on sunglasses only. Moreover, a pair of primary magnet members is always located in front of the user's eyes.

Apart from all these, there is widely ignored problem for conventional spectacles set that virtually no conventional shelter frame has been developed to cater for primary eyeglasses which are made of or embedded by plastics materials. In such a case, conventional shelter frame is not suitable since the clipping claws are not specifically designed to engage with the primary eyeglasses which has a wider primary bridge.

In U.S. Pat. No. 6,231,180, the applicant of the present invention invented a detachable shelter frame for mounting on a primary spectacle frame by means of at lease two resilient mounting devices. In U.S. Pat. No. 6,464,352, the applicant of the present invention further invented a detachable shelter frame constructed to mount on a primary spectacle frame by two resilient mounting devices which are extended from two inner sides of two auxiliary lenses respectively. Both patents suggest the use of resilient mounting devices each comprising a resilient arm and an engaging member for mounting the shelter frame in front of the primary spectacle frame without the use of any magnets, wherein the shelter frame is mounted on the primary spectacle frame by a two-points or more engagement by the engaging members of the resilient mounting devices with respect to the two side extensions, the lens frames or the two ends of the bridge of the primary spectacle frame. Although the resilient arms substantially enable the engaging members holding on the primary spectacle frame so as to hold the shelter frame in position, the applicant continuously seeks for better or alternative attachment structure between the shelter frame and the primary spectacle frame for easier operation and more secure attachment.

SUMMARY OF THE PRESENT INVENTION

A main object of the present invention is to provide a spectacles set, wherein a mounting arrangement of a detachable shelter frame is arranged for detachably mounting the detachable shelter frame in front of a primary spectacles by means of at least a point support and a surface support to securely mount the detachable shelter frame in front of a primary spectacles in a detachably attaching manner so as to enhance and facilitate the mounting operation of the detachable shelter frame.

Another object of the present invention is to provide a spectacles set, wherein in addition to point supports, the mounting arrangement of the detachable shelter frame further provides a surface support to substantially holding the shelter bridge and the primary bridge together for better and more secure attachment between the detachable shelter frame and the primary spectacles.

Another object of the present invention is to provide a spectacles set, wherein the mounting arrangement provides a surface support, in addition to one or more point supports, between a protruding holding portion and an indenting holding groove to provide an attachment between detachable shelter frame and the primary spectacles with an effect of holding in position.

Another object of the present invention is to provide a spectacles set, wherein a mounting arrangement of a detachable shelter frame is arranged to apply an urging force to securely mount the detachable shelter frame in front of a primary spectacles in a detachably attaching manner so as to enhance the mounting operation of the detachable shelter frame.

Another object of the present invention is to provide a spectacles set, wherein a mounting arrangement of a detachable shelter frame is arranged to apply an urging force which also holds the protruding holding portion in the indenting holding groove to ensure the surface support of the detachable shelter frame with respect to the primary spectacles in addition to the one or more point-support attachment.

Another object of the present invention is to provide a spectacles set, wherein the mounting arrangement comprises a supporting arm extended to a primary bridge of the primary spectacles to support a weight of the detachable shelter frame by the primary bridge and a retention member arranged to apply the urging force against the primary bridge to retain the detachable shelter frame in position. Therefore, the detachable shelter frame can be substantially mounted in front of the primary spectacles.

Another object of the present invention is to provide a spectacles set, wherein the retention member has an engaging tip substantially engaged with the primary bridge to hold the detachable shelter frame in position so as to prevent up and down or sideward movement of the detachable shelter frame with respect to the primary spectacles.

Another object of the present invention is to provide a spectacles set, wherein the wearer may merely use one hand to attach or detach the detachable shelter frame during exercising or driving without distorting the structure of the primary spectacles.

Another object of the present invention is to provide a spectacles set, wherein the detachable shelter frame is adapted to incorporate with any kind of primary spectacles having a primary bridge extended between two lenses, such that the primary spectacles does not require to alter its original structural design to fit the detachable shelter frame so as to minimize the cost of the spectacles set. In other words, the primary spectacles can be made of or embedded by plastics materials in which the primary spectacles should have a wider primary bridge.

Another object of the present invention is to provide a spectacles set, wherein no expensive or complicated mechanical structure is required to employ in the present invention in order to achieve the above mentioned objects. Therefore, the present invention successfully provides an economic and efficient solution not only for providing the supporting arm to securely support the detachable spectacles frame in front of the primary spectacles but also for retaining the detachable shelter frame in front of the primary spectacles through the retention member.

Another object of the present invention is to provide a spectacles set, wherein the mounting arrangement may be embodied as forming three discrete points for supporting the detachable shelter frame on the primary spectacles so as to ensure maximum balance of the detachable shelter frame.

Accordingly, in order to accomplish the above objects, the present invention provides a detachable shelter frame adapted for detachably mounting in front of a primary spectacles which comprises a pair of lenses, a primary bridge extended between two inner sides of the lenses, and two side extensions provided at two outer sides of the lenses for coupling a pair of temples respectively, wherein the detachable shelter frame comprises two shelter lenses, a shelter bridge extended between two inner sides of the shelter lenses, and a mounting arrangement comprising at least a point support and a surface support provided on the detachable shelter frame for mounting the detachable shelter frame on the primary spectacles, wherein at least one of the point support and the surface support is formed at the shelter bridge to engage with the primary bridge for substantially retaining the shelter frame to mount in front of the primary spectacles in a balanced manner.

BRIEF DESCRIPTION OF THE DRAWINGS

FIG. 9A is a perspective view of a spectacles set according to a third preferred embodiment of the present invention, illustrating that the shelter frame is attached on the primary spectacles.

DETAILED DESCRIPTION OF THE PREFERRED EMBODIMENT

Figure 1A:
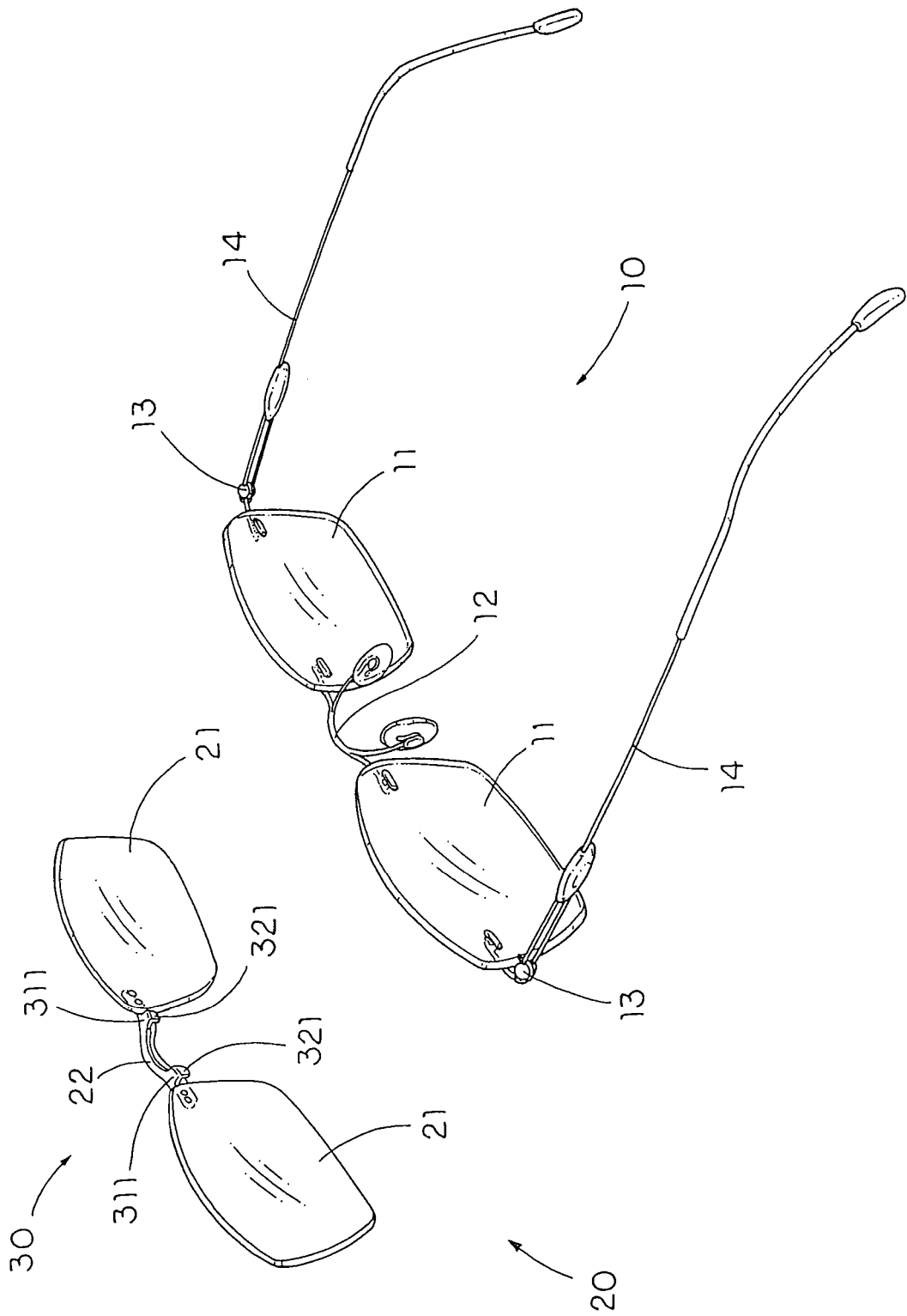
FIG. 1A is a perspective view of a spectacles set according to a first preferred embodiment of the present invention.

Referring to FIGS. 1A to 2B of the drawings, a spectacles set according to a first embodiment of the present invention is illustrated, wherein the spectacles set comprises a primary spectacles 10 and a detachable shelter frame 20 detachably mounting in front of the primary spectacles 10.

The primary spectacles 10 comprises two lenses 11, a primary bridge 12 extended from two inner sides of the lenses 11 respectively, and two side extensions 13 provided at two outer sides of the lenses 11 for coupling a pair of temples 14 respectively.

The detachable shelter frame 20 comprises two shelter lenses 21, a shelter bridge 22 extended between two inner sides of the shelter lenses 21, and a mounting arrangement 30 comprising first and second supporting members 31 spacedly provided on the detachable shelter frame 20 to mount on the primary spectacles 10 for providing at least a two-point support of the shelter frame 20 on the primary spectacles 10, wherein at least one of the supporting members 31 is extended from the shelter bridge 22 to engage with the primary bridge 10 for retaining the shelter frame 10 on the primary spectacles 10 in a balanced manner.

Figure 1B:
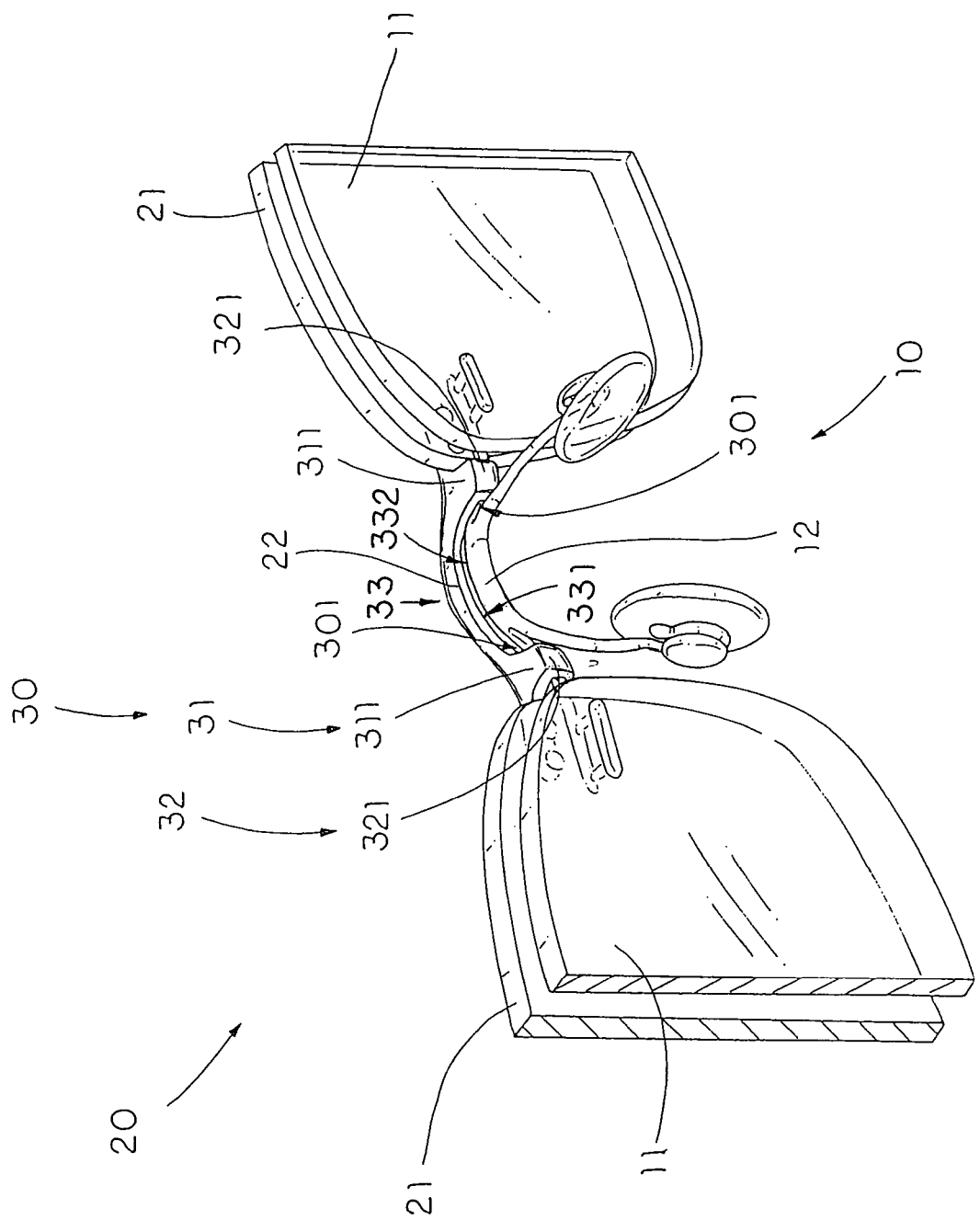
FIG. 1B is a partially perspective view of the spectacles set according to the above preferred embodiment of the present invention, illustrating the detachable shelter frame being mounted in front of the primary spectacles.
Figure 1C:
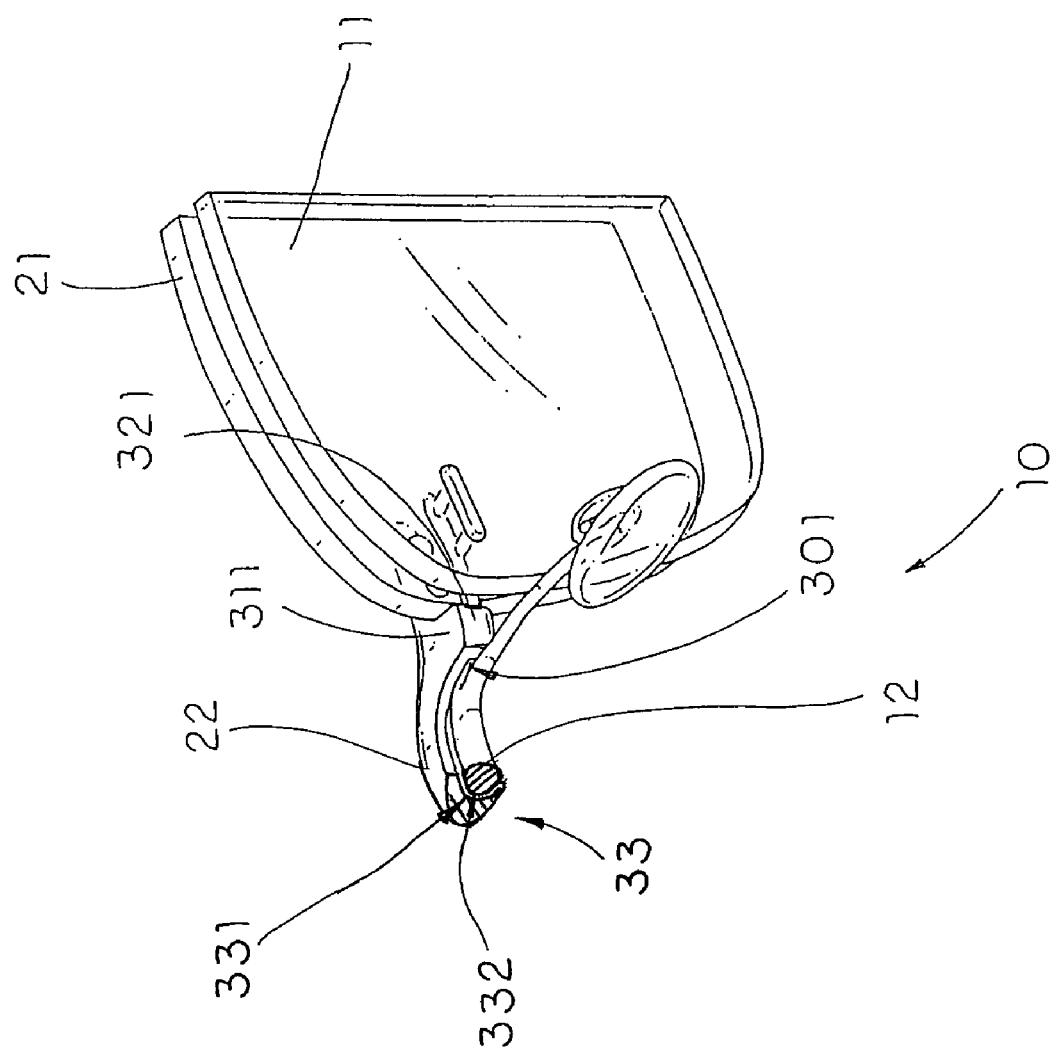
FIG. 1C is a sectional perspective view of the spectacles set according to the above preferred embodiment of the present invention, illustrating the surface support between the detachable shelter frame and the primary spectacles.

Referring to FIGS. 1B and 1C, in addition to the point supports provided by the supporting members 31, the mounting arrangement 30 further has a holding groove 331 indented on a rear side of the shelter bridge 22 of the detachable shelter frame 20 to receive a holding portion 332 protruded from a front side of the primary bridge 12 of the primary spectacles 10 to form a surface support 33 of the mounting arrangement 30, wherein the indenting holding groove 331 of the shelter bridge 22 is embodied to have a C-shaped cross section to define an inwardly curved inner surface to substantially hold and support the outwardly curved outer surface of the protruding holding portion 332 of the primary bridge 12 in position. Accordingly, the surface support 33 enables the shelter bridge 22 to hold the primary bridge 12 together that enhances the attachment between the detachable shelter frame 20 and the primary spectacles 10.

Practically, the primary spectacles 10 can be constructed as a conventional spectacles frame to have a pair of lens rims or a rimless frame that the primary bridge 12 and the two side extensions 13 are directly fastened to the edges of the two lenses 11. In other words, the primary spectacles 10 does not require to modify its original structure for mounting the detachable shelter frame 20 thereon.

According to the preferred embodiment, the supporting member 31 comprises two supporting arms 311 rearwardly extended from two end portions of the shelter bridge 22 respectively to spacedly and rigidly ride on the primary bridge 12 so as to support a weight of the detachable shelter frame 20 at the primary bridge 12 when the detachable shelter frame 20 is mounted in front of the primary spectacles 10, as shown in FIG. 1B.

The supporting members 31 are rearwardly extended from the shelter bridge 22 to ride on the primary bridge 12 so as to support the shelter lenses 21 aligning with the lenses 11 respectively and a retention member 32 rearwardly extending to apply an urging force against the primary bridge 12 to engage with a rear side of the primary bridge 12 when the detachable shelter frame 20 is mounted in front of the primary spectacles 10 so as to substantially retain the detachable shelter frame 20 in position. Moreover, the urging force also ensures the outer surface of the holding portion 332 of the primary bridge 12 in contact with the inner surface of the holding groove 331 of the shelter bridge 22 to provide a surface support for the attachment between the detachable shelter frame 20 and the primary spectacles 10.

Each of the supporting arms 311 has a length adapted to extend from the shelter bridge 12 to the rear side of the primary bridge 12 when the detachable shelter frame 20 is mounted in front of the primary spectacles 10. The supporting arms 311 are rigidly extended from the shelter bridge 22 to support on the primary bridge 12 so as to support the weight of the detachable shelter frame 20 at the primary bridge 12. Preferably, each of the supporting arms 311 is horizontally extended from the shelter bridge 22 to ride on the primary bridge 12.

The retention member 32 comprises two retention arms 321 downwardly extended from two rear ends of the two supporting arms 311 respectively to engage with the rear side of the primary bridge 12, wherein an engaging groove 301 is formed within the shelter bridge 22, the supporting arm 311 and the retention arm 321 for the primary bridge 12 slidably receiving in the engaging groove 301. In other words, the retention arms 321 are extended from the supporting arms 311 to form two mounting members having L-shaped cross section to mount at the primary bridge 12.

Each of the engaging grooves 301 has a width slightly larger than a thickness of the primary bridge 12 such that two end portions of the primary bridge 12 are fittingly received in the engaging grooves 301 respectively to engage the retention arms 321 with the rear side of the primary bridge 12 so as to retain the detachable shelter frame 20 in front of the primary spectacles 10.

Figure 2A:
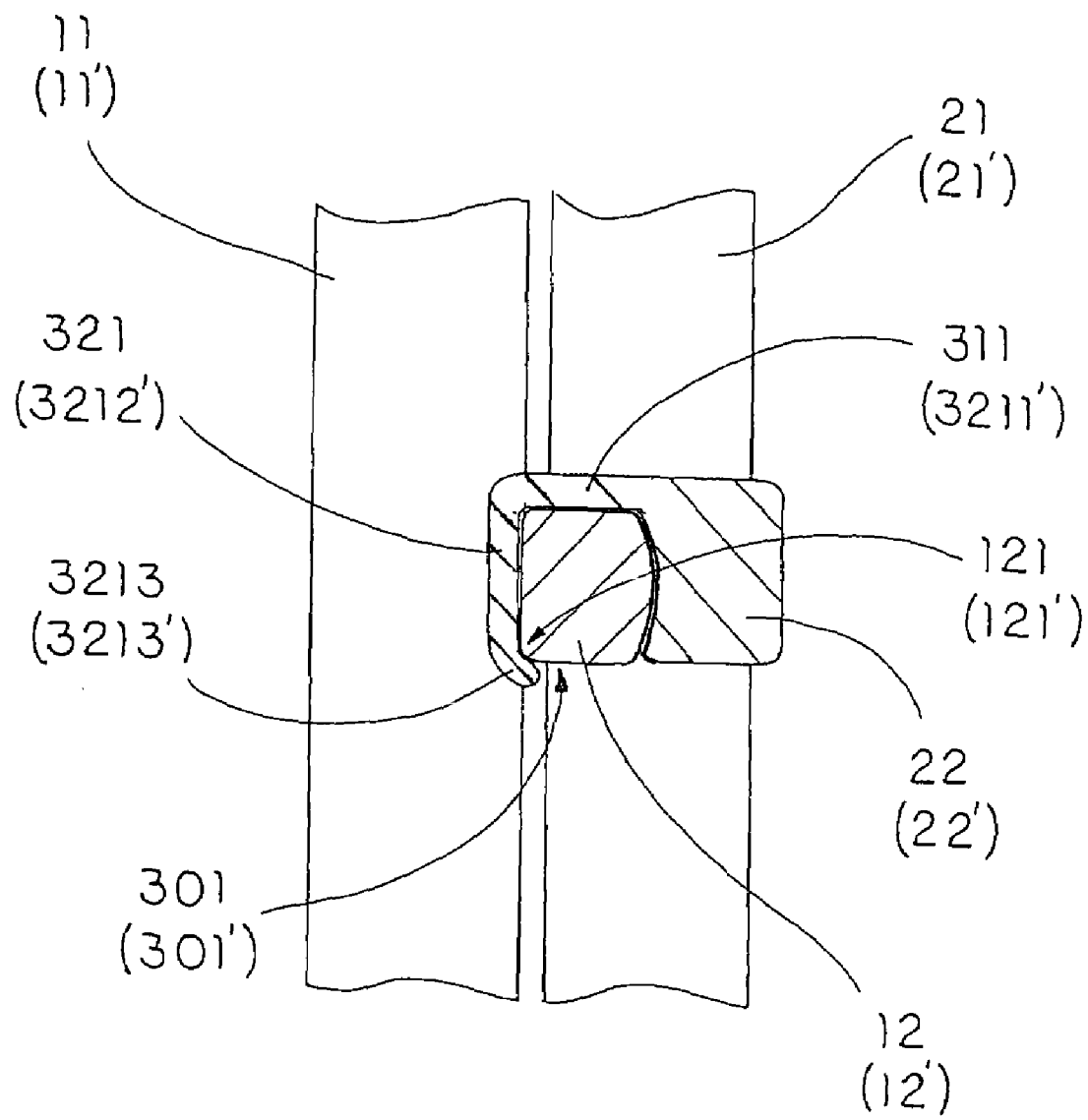
FIG. 2A is a schematic view of the spectacles set according to the above preferred embodiment, illustrating the detachable shelter frame being mounted in front of the primary spectacles.

As shown in FIGS. 1B and 2A, the mounting arrangement 30 is integrally extended from the shelter bridge 22 to form a one-piece integral member such that the supporting arms 311 of the supporting member 31 are integrally extended from the two end portions of the shelter bridge 22 respectively and the retention arms 321 of the retention member 32 are integrally extended from the two rear ends of the two supporting arms 311 respectively. Preferably, the shelter bridge 22 and the mounting arrangement 30 are made of lightweight but durable material, such as plastic, such that the overall weight of the detachable shelter frame 20 can be substantially reduced while the detachable shelter frame 20 can precisely mount in front of the primary spectacles 10. In addition, the retention arms 321 are made of plastic such that the retention arms 321 are adapted to apply the urging force against the primary bridge 12 to engage with the rear side thereof.

Each of the retention arms 321 may further has a bottom engaging tip 3213 extending inwardly to engage with an engaging edge 121 of the primary bridge 12 when the retention arm 321 engages with the rear side of the primary bridge 12.

Accordingly, the engaging edge 121 of the primary bridge 12 forms at a bottom edge thereof wherein when the supporting arms 311 ride on the primary bridge 12, the engaging tips 3213 of the retention arms 321 are slid at the rear side of the primary bridge 12 to apply the urging force thereto until the engaging tips 3213 of the retention arms 321 reach the engaging edge 121 of the primary bridge 12 so as to ensure the engagement between the retention arm 321 and the primary bridge 12. In other words, each of the retention arms 321 has a predetermined length downwardly extending to engage with the bottom edge as the engaging edge 121 of the primary bridge 12.

As a result, the mounting arrangement 30 forms the two-point support by the two supporting members 311, 312, in which the detachable shelter frame 20 is substantially retained on the primary spectacles 10.

In order to mount the detachable shelter frame 20 in front of the primary spectacles 10, the wearer may merely use one hand to hold the shelter bridge 22 to align with the primary bridge 12 at a position that the retention arms 321 of the retention member 32 is aligned to the rear side of the primary bridge 12. Therefore, the wearer is able to apply a downward pulling force on the shelter bridge 22 against the primary bridge 12 to slide the primary bridge 12 into the engaging grooves 301 such that the engaging tips 3213 of the retention arms 321 are slid at the rear side of the primary bridge 12 to apply the urging force thereto. Once the supporting arms 311 of the supporting member 31 is supported on the primary bridge 12 to support the detachable shelter frame 20 by the primary bridge 12, the retention arms 321 are securely engaged with the rear side of the primary bridge 12 at a position that the engaging tips 3213 of the retention arms 321 reach the engaging edge 121 of the primary bridge 12 so as to retain the positions of the shelter lenses 21 of the detachable shelter frame 20 to align with the lenses 12 of the primary spectacles 10 respectively.

Figure 2B:
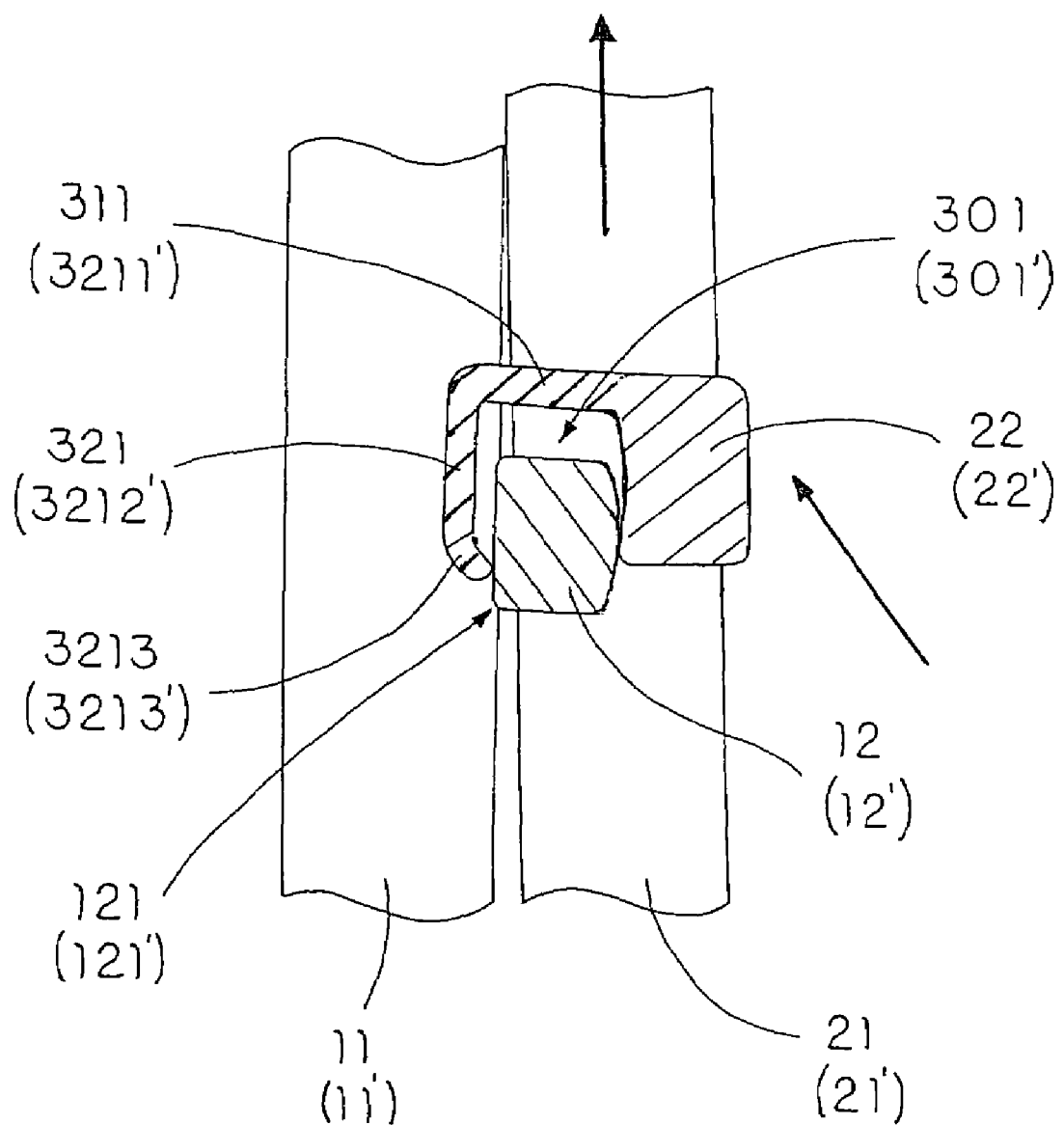
FIG. 2B illustrates the detachable shelter frame is detaching from the primary spectacles when an upward pulling force is applied on the detachable shelter frame according to the above preferred embodiment of the present invention.

For detaching the detachable shelter frame 20 from the primary spectacles 10, the wearer merely uses one hand to apply an upward pulling force against the shelter bridge 22 to slide the engaging tips 3213 of the retention arms 321 offset to the engaging edge 121 of the primary bridge 12. Once the engaging tips 3213 of the retention arms 321 are disengaged with the engaging edge 121 of the primary bridge 12, the urging force of the retention member 32 intends to pull the shelter bridge 22 upwardly so as to lift up the shelter bridge 22 from the primary bridge 12 to substantially detach the detachable shelter frame 20 from the primary spectacles 10, as shown in FIG. 2B. In other words, the engaging tips 3213 of the retention arms 321 are offset from the engaging edge 121 of the primary bridge 12, the detachable shelter frame 20 is automatically popped up from the primary spectacles 10.

It is worth to mention that the mounting arrangement 30 is integrally extended from the shelter bridge 22 to formed a one piece rigid member, such that when the wearer applies the pulling force as the external force on the primary bridge 12, the mounting arrangement 30 is capable of withstanding the external force so as to prevent the primary bridge 13 from being distorted. In other words, the mounting arrangement 30 is strong enough to not only rigidly support the shelter lenses 21 in front of the lenses 11 but also substantially retain the detachable shelter frame 20 in position.

Figure 3:
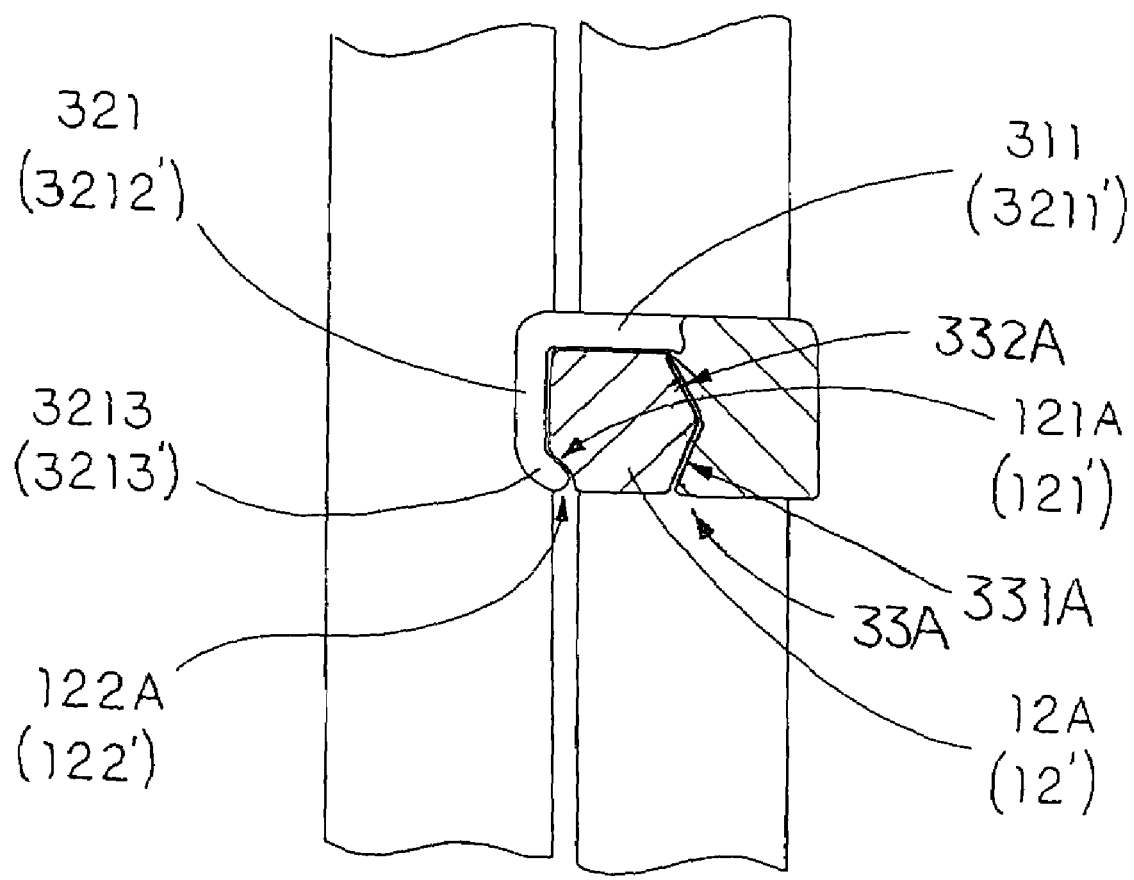
FIG. 3 illustrates a first alternative mode of the mounting arrangement of the spectacles set according to the above preferred embodiment, illustrating the detachable shelter frame being mounted in front of the primary spectacles.

FIG. 3 illustrates a first alternative mode of the primary bridge 12A which has a positioning groove 122A indently and longitudinally formed along the bottom edge of the primary bridge 12A wherein the engaging edge 121A is formed at a shoulder edge of the positioning groove 122A such that when the supporting arms 311 ride on the primary bridge 12A, the engaging tips 3213 of the retention arms 321 are slid at the rear side of the primary bridge 12A to apply the urging force thereto until the engaging tips 3213 of the retention arms 321 reach the engaging edge 121A of the primary bridge 12A that the engaging tips 3213 of the retention arms 321 are received at the positioning groove 122A so as to ensure the engagement between the retention arm 321 and the primary bridge 12A. In addition, the indenting holding groove 331A of the shelter bridge 22A has an inwardly V-shaped cross section and the protruding holding portion 332A of the primary bridge 12A has an outwardly V-shaped cross section for fittingly received in the V-shaped holding groove 331A so as to enable shelter bridge 22A to hold the primary bridge 12A together to enhance the attachment between the detachable shelter frame and the primary spectacles.

Figure 4:
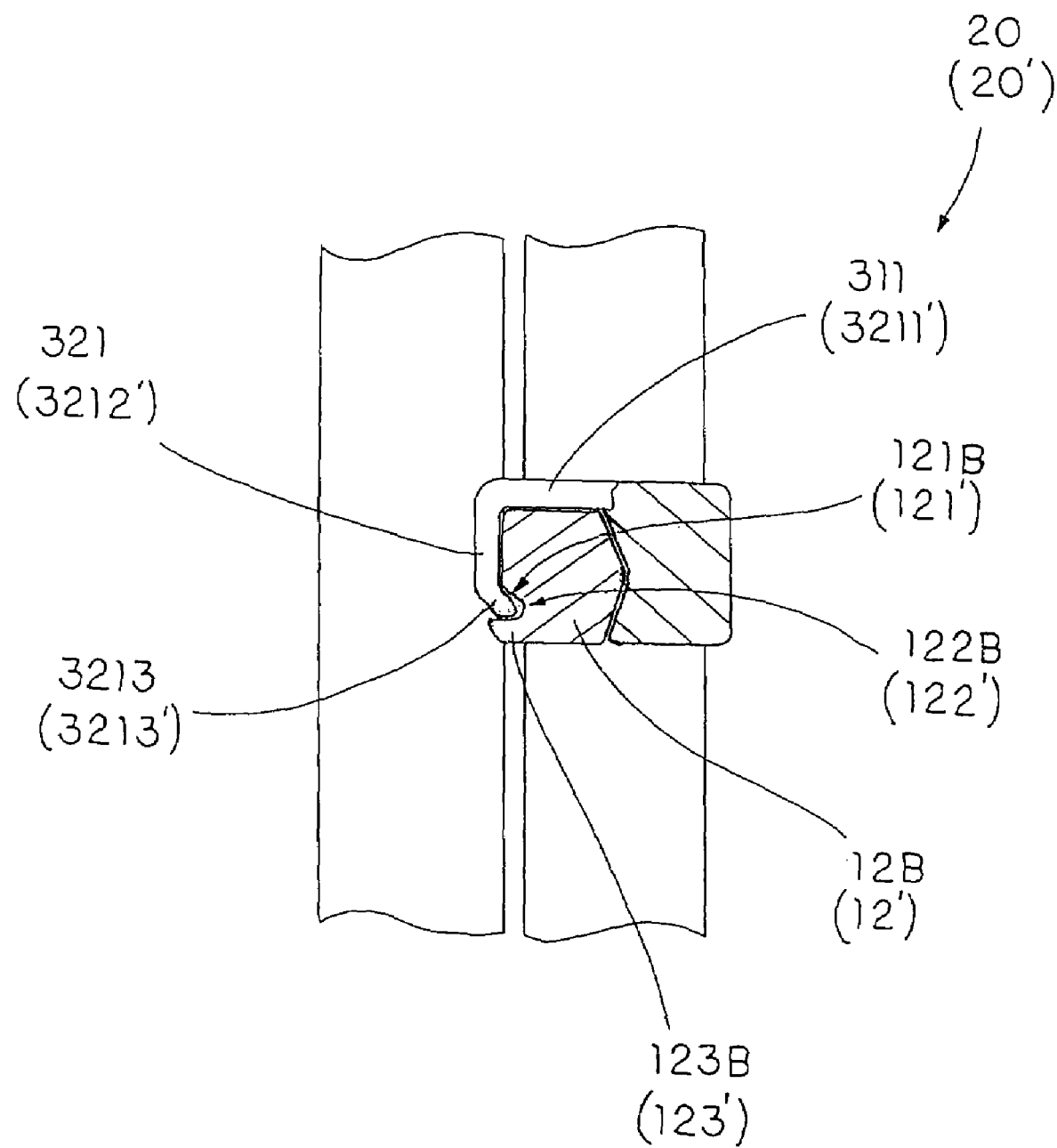
FIG. 4 illustrates a second alternative mode of the mounting arrangement of the spectacles set according to the above preferred embodiment, illustrating the detachable shelter frame being mounted in front of the primary spectacles.

FIG. 4 illustrates a second alternative mode of the primary bridge 12B which has a positioning groove 122B indently and longitudinally formed along a bottom portion of the primary bridge 12B wherein the engaging edge 121B is formed at a shoulder edge of the positioning groove 122B such that when the supporting arms 311 ride on the primary bridge 12B, the engaging tips 3213 of the retention arms 321 are slid at the rear side of the primary bridge 12B to apply the urging force thereto until the engaging tips 3213 of the retention arms 321 reach the engaging edge 121B of the primary bridge 12B that the engaging tips 3213 of the retention arms 321 are received at the positioning groove 122B while a bottom edge of the primary bridge 12B forms a blocking edge 123B to block the engaging tips 3213 of the retention arms 321 to further slide downwardly so as to ensure the engagement between the retention arm 321 and the primary bridge 12B.

It is worth to mention that the blocking edge 123B of the primary bridge 12B can also substantially support the weight of the detachable shelter frame 20 since the blocking edge 123B of the primary bridge 12B supports the engaging tips 3213 of the retention arms 321 thereon. In addition, the length of the retention arm 321 can be substantially reduced to engage with the rear side of the primary bridge 12B.

Figure 5:
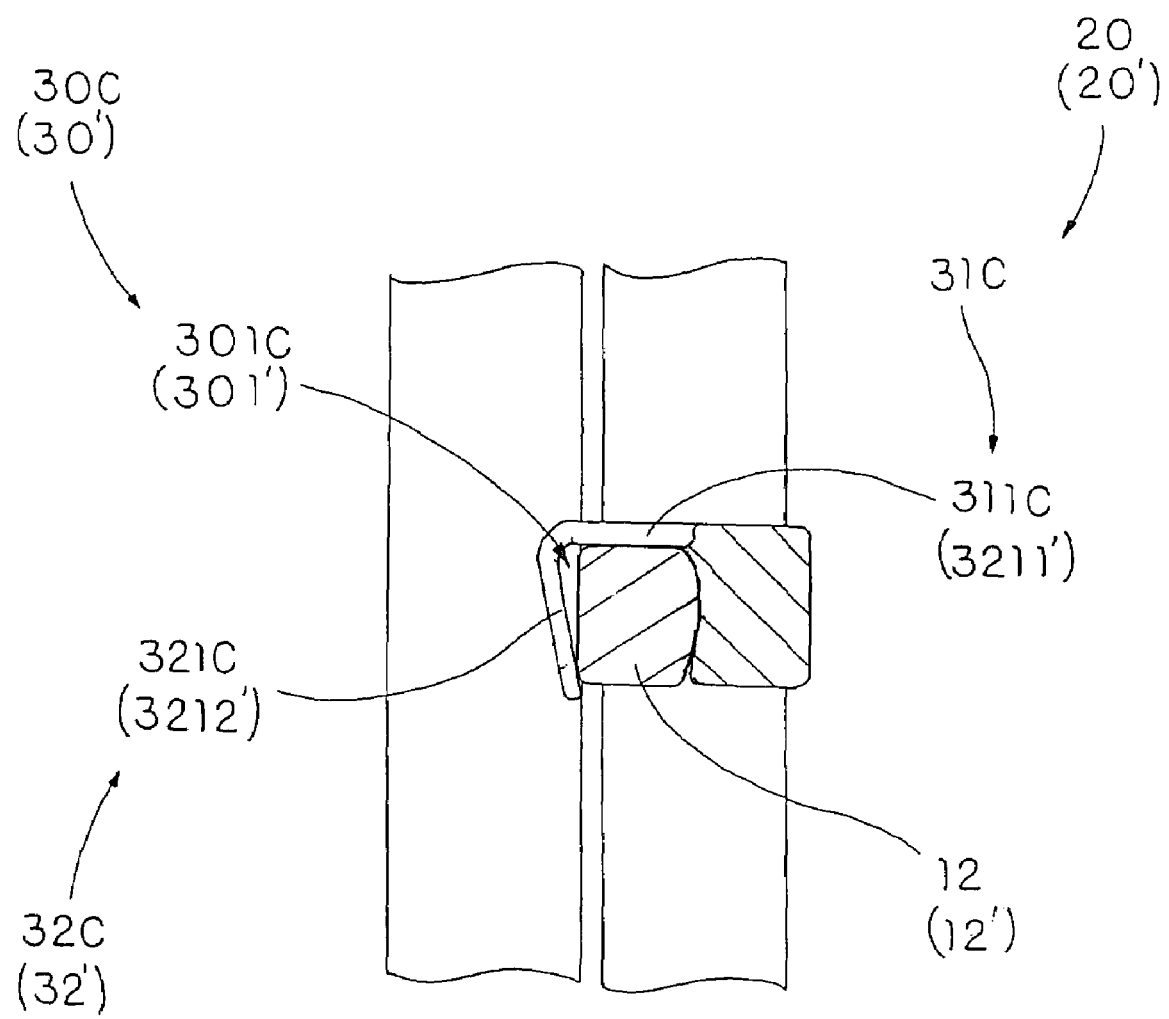
FIG. 5 illustrates a third alternative mode of the mounting arrangement of the spectacles set according to the above preferred embodiment, illustrating the detachable shelter frame being mounted in front of the primary spectacles.

FIG. 5 illustrates an alternative mode of the mounting arrangement 30C wherein the retention arms 321C of the retention member 32C are downwardly and inwardly extended from two rear ends of the two supporting arms 311C of the supporting member 31C respectively to engage with the rear side of the primary bridge 12, wherein an engaging groove 301C is formed within the shelter bridge 22, the supporting arm 311C and the retention arm 321C for the primary bridge 12 slidably receiving in the engaging groove 301C.

As shown in FIG. 5, the engaging groove 301C has a width gradually reducing from the supporting arm 311C towards a downward opening at a bottom end of the retention arm 321C such that when the retention arm 321C is slidably engaged with the rear side of the primary bridge 12, the retention arm 321C applies the urging force against the primary bridge 12 to substantially retain the detachable shelter frame 20 in position.

Figure 6:
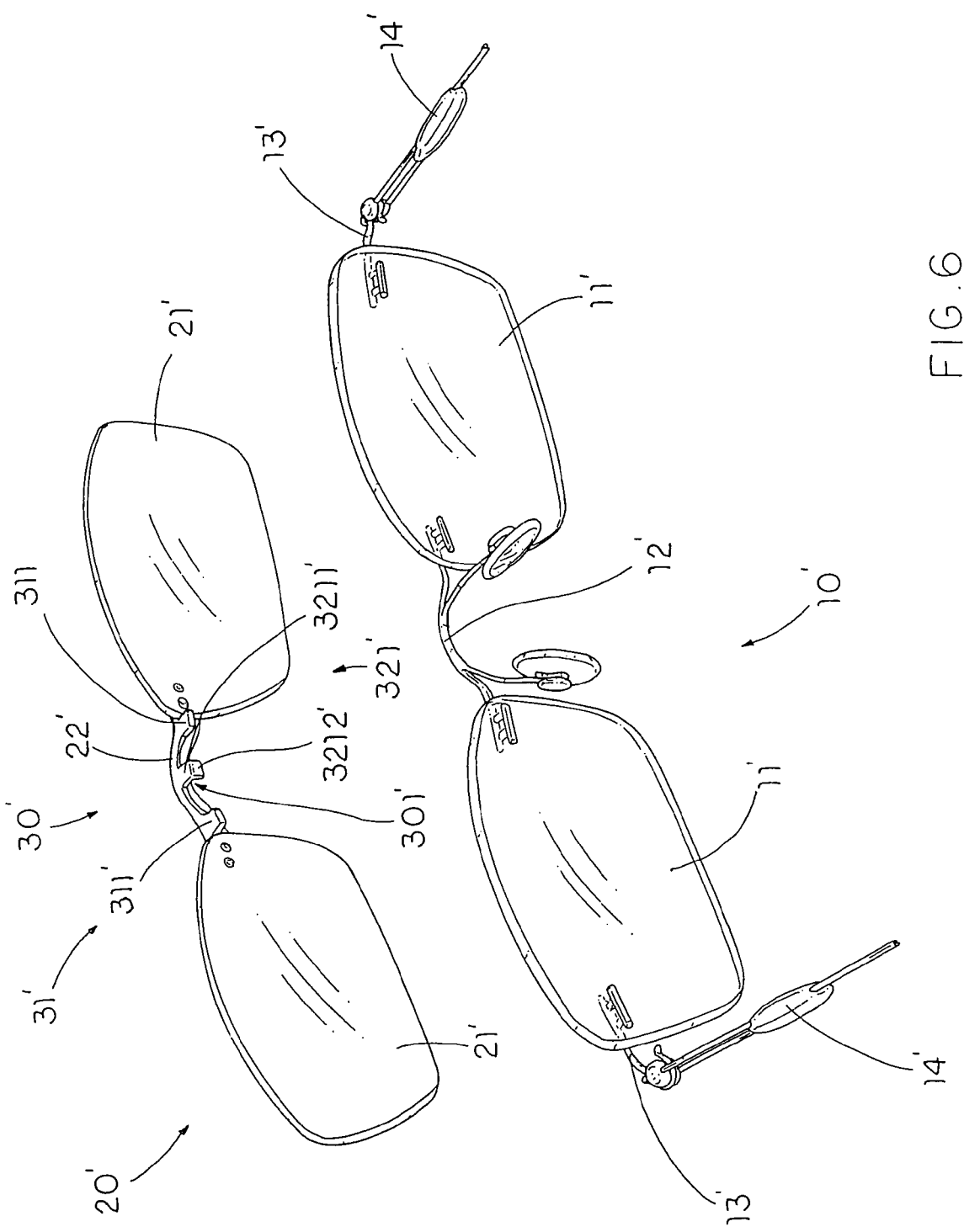
FIG. 6 is a perspective view of a spectacles set according to a second preferred embodiment of the present invention.
Figure 7A:
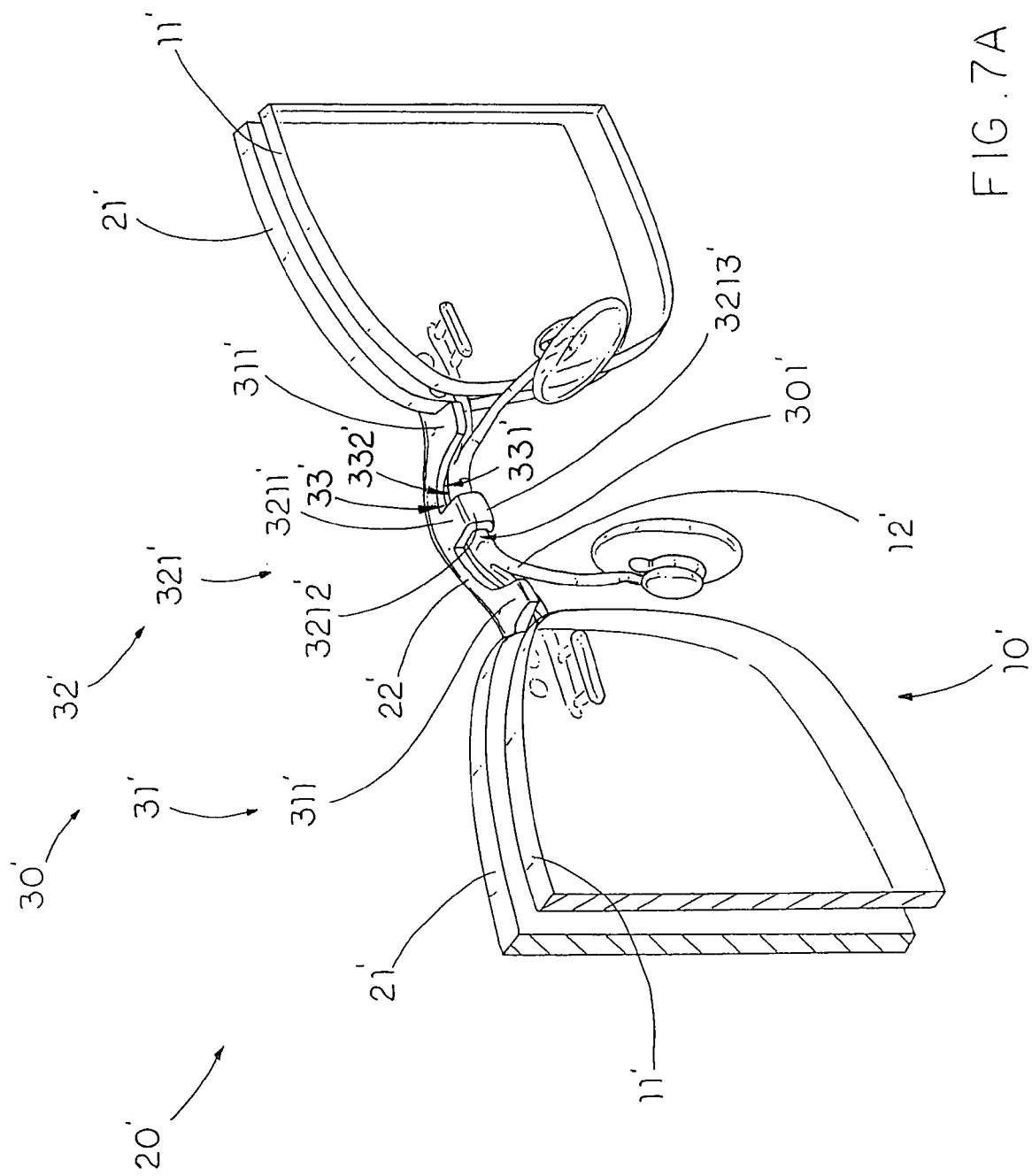
FIG. 7A is a partially perspective view of the spectacles set according to the above preferred embodiment, illustrating the detachable shelter frame being mounted in front of the primary spectacles.
Figure 7B:
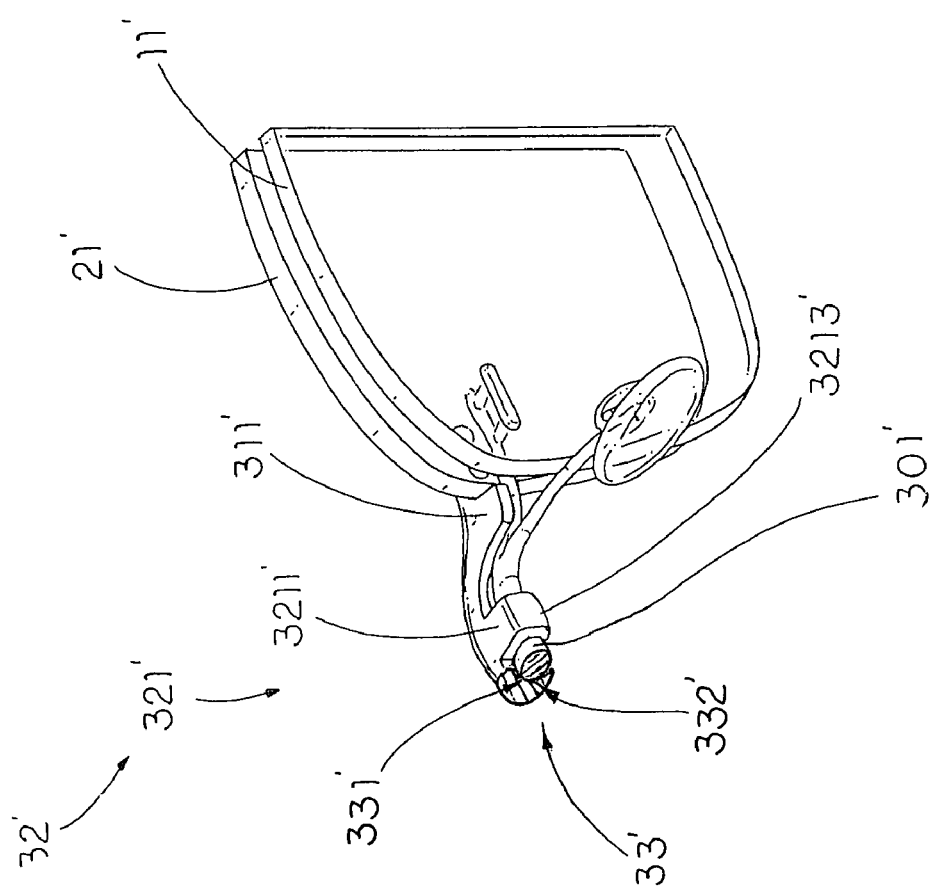
FIG. 7B is a sectional perspective view of the spectacles set according to the above preferred embodiment, illustrating the surface support of the detachable shelter frame and the primary spectacles.

As shown in FIGS. 6, 7A and 7B, a spectacles set of a second embodiment illustrates an alternative mode of the first embodiment of the present invention, wherein the detachable shelter frame 20' is detachably mounting in front of the primary spectacles 10'.

The primary spectacles 10' comprises two lenses 11', a primary bridge 12' extended from two inner sides of the lenses 11' respectively, and two side extensions 13' provided at two outer sides of the lenses 11' for coupling a pair of temples 14' respectively.

The detachable shelter frame 20' comprises two shelter lenses 21', a shelter bridge 22' extended between two inner sides of the shelter lenses 21', and a mounting arrangement 30' comprising at least a supporting member 31' rearwardly extended from the shelter bridge 22' to ride on the primary bridge 12' so as to support the shelter lenses 21' aligning with the lenses 11' respectively and a retention member 32' rearwardly extending to apply an urging force against the primary bridge 12' to engage with a rear side of the primary bridge 12' when the detachable shelter frame 20' is mounted in front of the primary spectacles 10' so as to substantially retain the detachable shelter frame 20' in position.

As shown in FIG. 6, the supporting member 31' comprises two supporting arms 311' rearwardly extended from two end portions of the shelter bridge 22' respectively to spacedly ride on the primary bridge 12' so as to support a weight of the detachable shelter frame 20' at the primary bridge 12' when the detachable shelter frame 20' is mounted in front of the primary spectacles 10'. In other words, the supporting arms 311' are integrally and rigidly extended from the shelter bridge 22' to support on the primary bridge 12' so as to support the weight of the detachable shelter frame 20' at the primary bridge 12'. Preferably, each of the supporting arms 311' is horizontally extended from the shelter bridge 22' to ride on the primary bridge 12'.

The retention member 32 comprises a retention arm 321' rearwardly extended from a mid-portion of the shelter bridge 22' to engage with the rear side of the primary bridge 12', wherein the retention arm 321', having a L-shape cross section, has an extending portion 3211' rearwardly extended towards the primary bridge 12' and an retaining portion 3212' which is downwardly extended from the extending portion 3211' to engage with the rear side of the primary bridge 12'.

An engaging groove 301' is formed within the shelter bridge 22', the extending portion 3211' of the retention arm 321' and the retaining portion 3212' thereof for the primary bridge 12 slidably receiving in the engaging groove 301'.

Each of the engaging grooves 301' has a width slightly larger than a thickness of the primary bridge 12' such that a mid-portion of the primary bridge 12' are fittingly received in the engaging groove 301' to engage the retention arm 321' with the rear side of the primary bridge 12' so as to retain the detachable shelter frame 20 in front of the primary spectacles 10'.

As shown FIG. 7A, the retention arm 321' is integrally extended from the shelter bridge 22' to form a one piece integral member. Accordingly, the portion 3211' of the retention arm 321' has a length adapted to extend from the shelter bridge 12' to the rear side of the primary bridge 12' when the detachable shelter frame 20' is mounted in front of the primary spectacles 10'. In addition, the extending portion 3211' of the retention arm 321' is rearwardly extended to ride on the primary bridge 12' and the retaining portion 3212' of the retention arm 321' is arranged to apply the urging force against the primary bridge 12' so as to substantially hold the detachable shelter frame 20' in front of the primary spectacles 10'.

The retention arm 321' further has a bottom engaging tip 3213' extending inwardly to engage with an engaging edge 121' of the primary bridge 12' when the retention arm 321' engages with the rear side of the primary bridge 12'. Accordingly, the engaging edge 121' of the primary bridge 12' forms at a bottom edge thereof wherein when the extending portion 3211' of the retention arm 321' rides on the primary bridge 12', the engaging tip 3213' of the retention arm 321' is slid at the rear side of the primary bridge 12' to apply the urging force thereto until the engaging tip 3213' of the retention arm 321' reaches the engaging edge 121' of the primary bridge 12' so as to ensure the engagement between the retention arm 321' and the primary bridge 12'. In other words, the retaining portion 3212' of the retention arm 321' has a predetermined length downwardly extending to engage with the bottom edge as the engaging edge 121' of the primary bridge 12'.

According to the second embodiment, the extending portion 3211' of the retention arm 321' is embodied as the supporting arm 311 to ride on the primary bridge 12. Therefore, it can be further modified that the retaining portion 3212' of the retention arm 321' to construct as the alternative modes of the first embodiment as shown in FIGS. 2A to 5. In other words, the engaging tip 3213' of the retention arm 321' can be slid to engage with the engaging edge 121' (bottom edge) of the primary bridge 12' as shown in FIG. 2A. The primary bridge 12' can further have a positioning groove 122' for the engaging tip 3213' of the retention arm 321' engaging therewith as shown in FIG. 3 and a bottom edge of the primary bridge 12' forms a blocking edge 123' to block the engaging tips 3211' of the retention arms 321' to further slide downwardly as shown in FIG. 4. Thus, the engaging groove 301' can be constructed to have a width gradually reducing from the engaging portion 3211' of the retention arm 321' towards a downward opening at a bottom end of the retention arm 321' to apply the urging force against the primary bridge 12' when the primary bridge 12' receives in the engaging groove 301', as shown in FIG. 5.

From the above descriptions, it is important to emphasize that each of the supporting member 31' also defines a point support for the detachable shelter frame 20', while the engaging groove 301' defines a surface support by at least one peripheral sidewall of the engaging groove 301' for retaining the detachable shelter frame 20' on the primary spectacles 10'. In other words, the mounting arrangement 30' altogether forms two point supports and one surface support for the detachable shelter frame 20' so as to be securely retained on the primary spectacles 10'.

Furthermore, referring to FIG. 7B, the mounting arrangement 30' may also provide an additional surface support 30' which has the holding groove 331' indented on the rear side of the shelter bridge 22' of the detachable shelter frame 20' to receive the holding portion 332' protruded from the front side of the primary bridge 12' of the primary spectacles 10', wherein the holding groove 331' of the shelter bridge 22' has an indented inner surface substantially holding and supporting the outwardly protruded outer surface of the holding portion 332' of the primary bridge 12' in position. In other words, the surface support 33' enables the shelter bridge 22' to hold the primary bridge 12' together that enhances the attachment between the detachable shelter frame 20' and the primary spectacles 10'.

Figure 8:
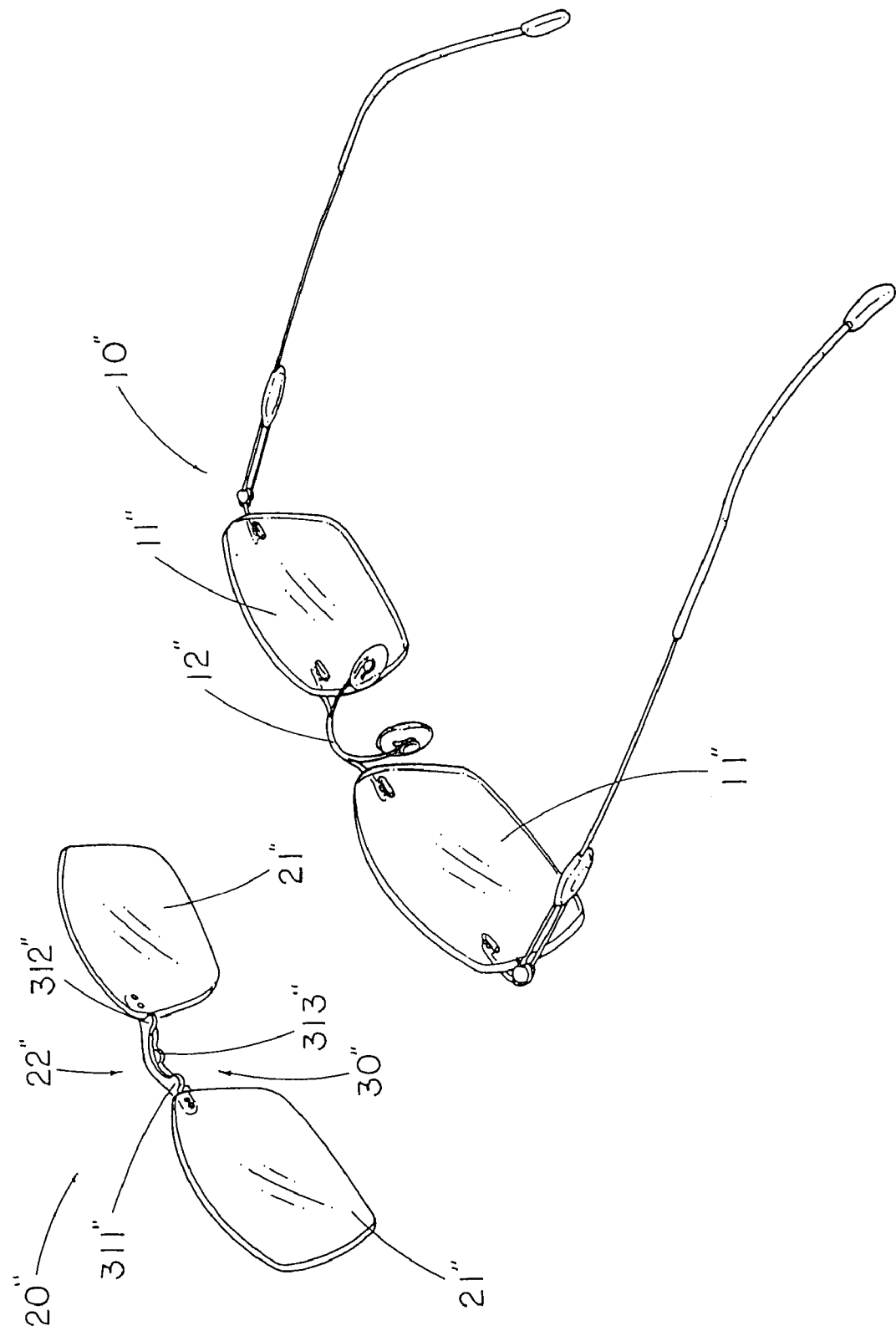
FIG. 8 is a perspective view of a spectacles set according to a third preferred embodiment of the present invention, illustrating that the shelter frame is detached from the primary spectacles.
Figure 9B:
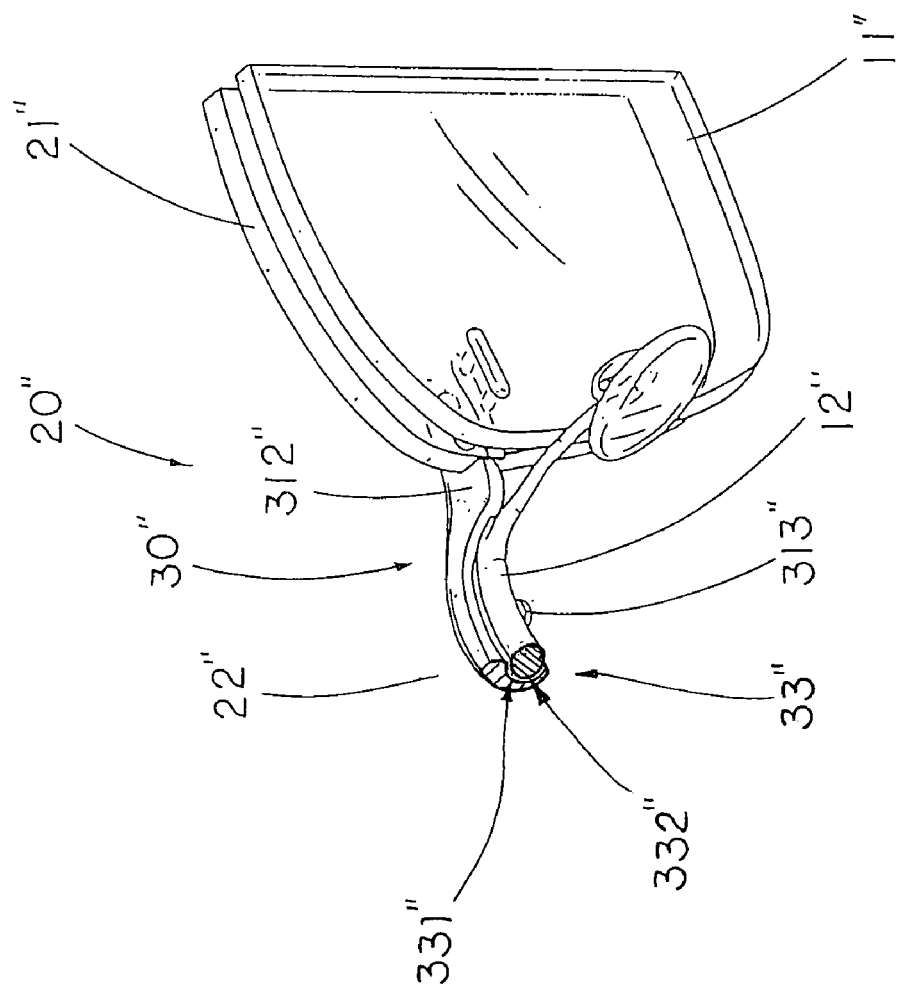
FIG. 9B is a sectional perspective view of a spectacles set according to the above third preferred embodiment of the present invention, illustrating the surface support of the shelter frame and the primary spectacles.
Figure 10:
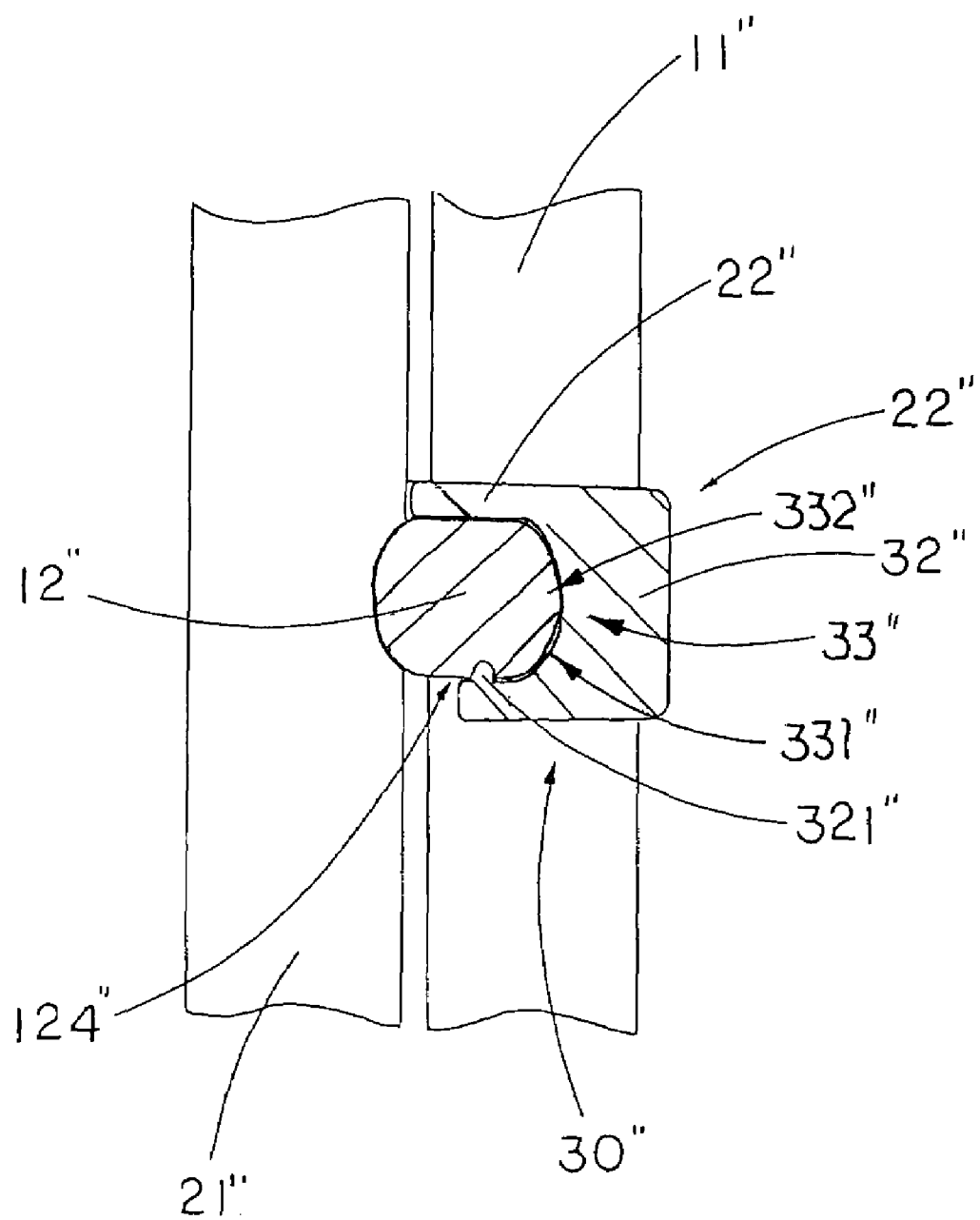
FIG. 10 is a sectional side view of the spectacles set according to the above third preferred embodiment of the present invention.
Figure 11:
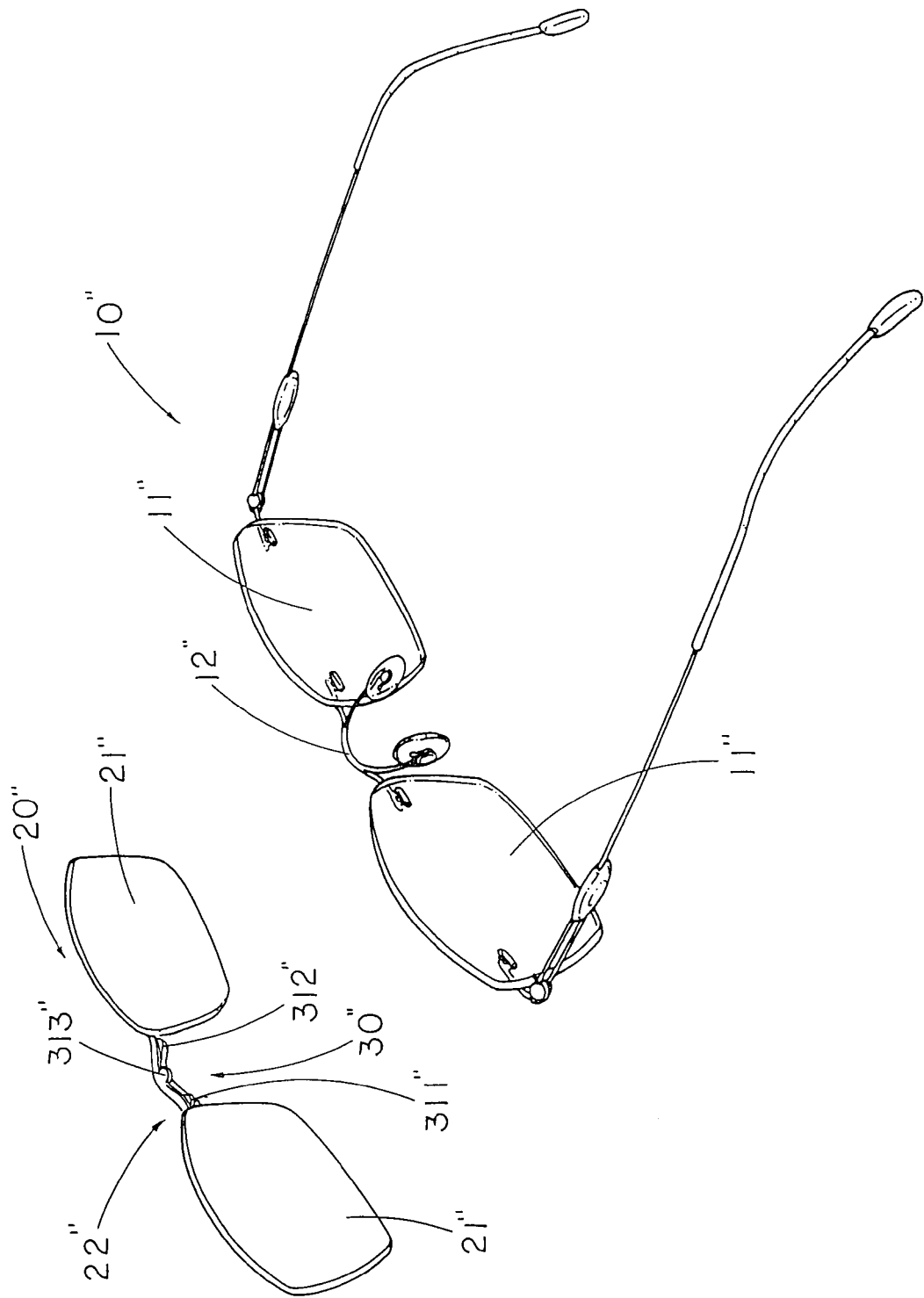
FIG. 11 is an alternative mode of the spectacles set according to the above third preferred embodiment of the present invention.

Referring to FIG. 8 to FIG. 10 of the drawings, the spectacles set according to a third preferred embodiment of the present invention is illustrated. The third preferred embodiment is similar to the first preferred embodiment except the detachable shelter frame 20".

According to the third preferred embodiment, the detachable shelter frame 20" comprises two shelter lenses 21", a shelter bridge 22" extended between two inner sides of the shelter lenses 21", and a mounting arrangement 30" comprising first through third supporting members 311", 312", 313" spacedly and rearwardly extended from the shelter bridge 22" to engage on the primary bridge 12" so as to create a three-point support for the shelter frame 20" while the shelter lenses 21" is aligning with the lenses 11" respectively, and a retention member 32" rearwardly extending to apply an urging force against the primary bridge 12" to engage with the primary bridge 12" when the detachable shelter frame 20" is mounted in front of the primary spectacles 10" so as to substantially retain the detachable shelter frame 20" in a balance manner.

Referring to FIG. 10 of the drawings, the first and the second supporting member 311", 312" are rearwardly extended from an upper portion of the shelter bridge 22" while the third supporting member 313" is rearwardly extended from a lower portion of the shelter bridge 22", wherein the first and second supporting members 311", 312" are substantially rest on the primary bridge 12" to support the detachable shelter frame 20" in front of the primary spectacles 10" while the third supporting member 313" is engaged with a bottom side of the primary bridge 12" to retain the detachable shelter frame 20" in position so as to securely mount the detachable shelter frame 20" in front of the primary spectacles frame 10" with the three-point support.

In addition, referring to FIG. 9B, the mounting arrangement 30" also provides a surface support 30" having the holding groove 331" indented on the rear side of the shelter bridge 22" of the detachable shelter frame 20" to receive the holding portion 332" protruded from the front side of the primary bridge 12" of the primary spectacles 10", wherein the holding groove 331" of the shelter bridge 22" has an indented inner surface substantially holding and supporting the outwardly protruded outer surface of the holding portion 332" of the primary bridge 12" in position. In other words, the surface support 33" enables the shelter bridge 22" to hold the primary bridge 12" together that enhances the attachment between the detachable shelter frame 20" and the primary spectacles 10".

According to the third preferred embodiment of the present invention, a length of the first and the second supporting members 311", 312" is preferably longer than a length of the third supporting member 313" so that the shelter frame 20" is capable of being substantially supported on the primary bridge 12".

Moreover, the retention member 32" comprises a retention arm 321" integrally and upwardly protruded from the third supporting member 313" to bias against a bottom surface 124" of the primary bridge 12" when it is engaged with the shelter frame 20" at the elongated holding channel 33". It is worth mentioning that the supporting members 311", 312", 313" are made of elastic materials for facilitating easy and convenient engagement between the shelter frame 20" and the primary bridge 12".

Figure 18A:
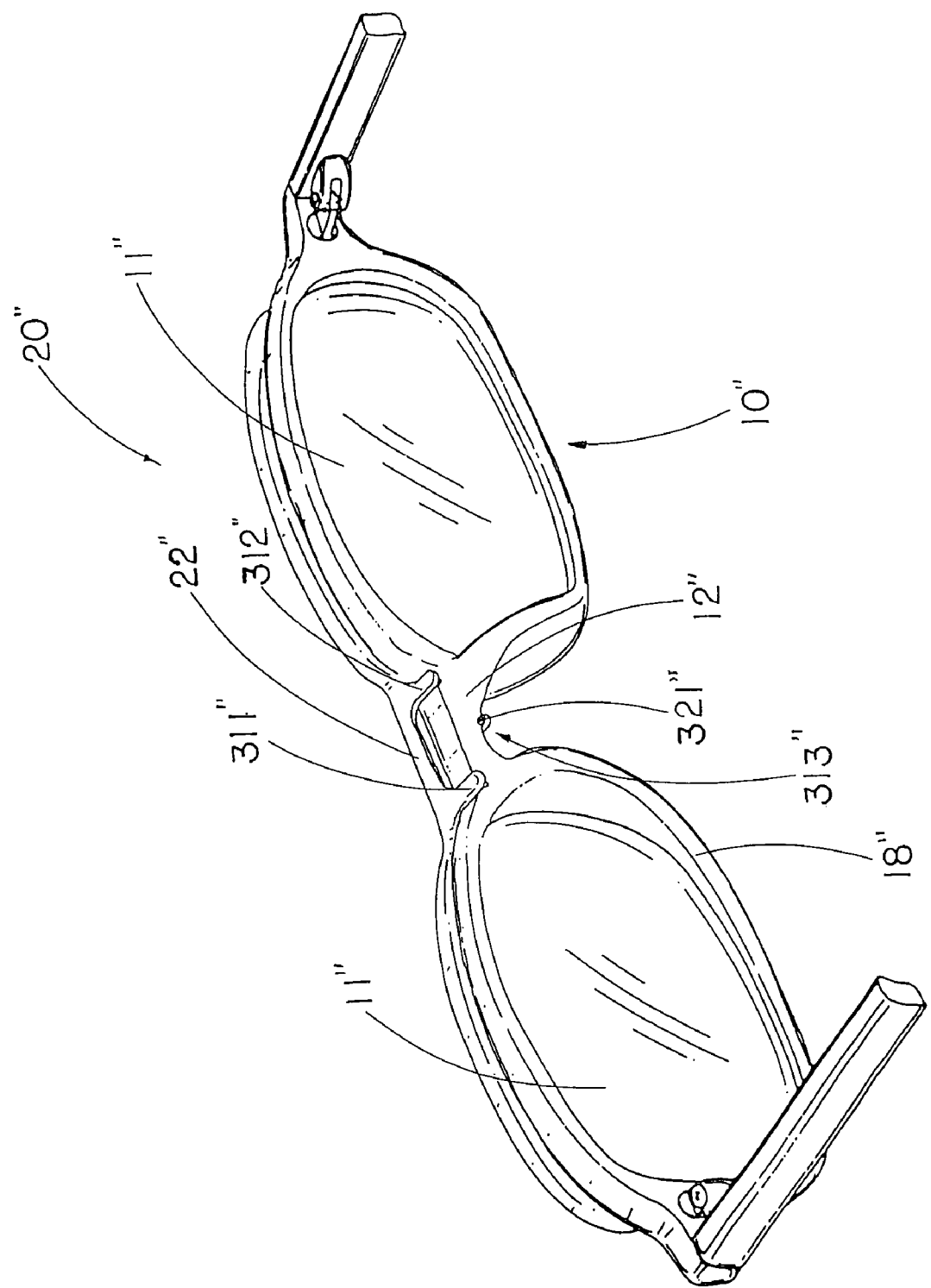
FIG. 18A is a first schematic diagram of the spectacles set according to the above third preferred embodiment of the present invention, illustrating that the primary spectacles have a plastic frame.
Figure 18B:
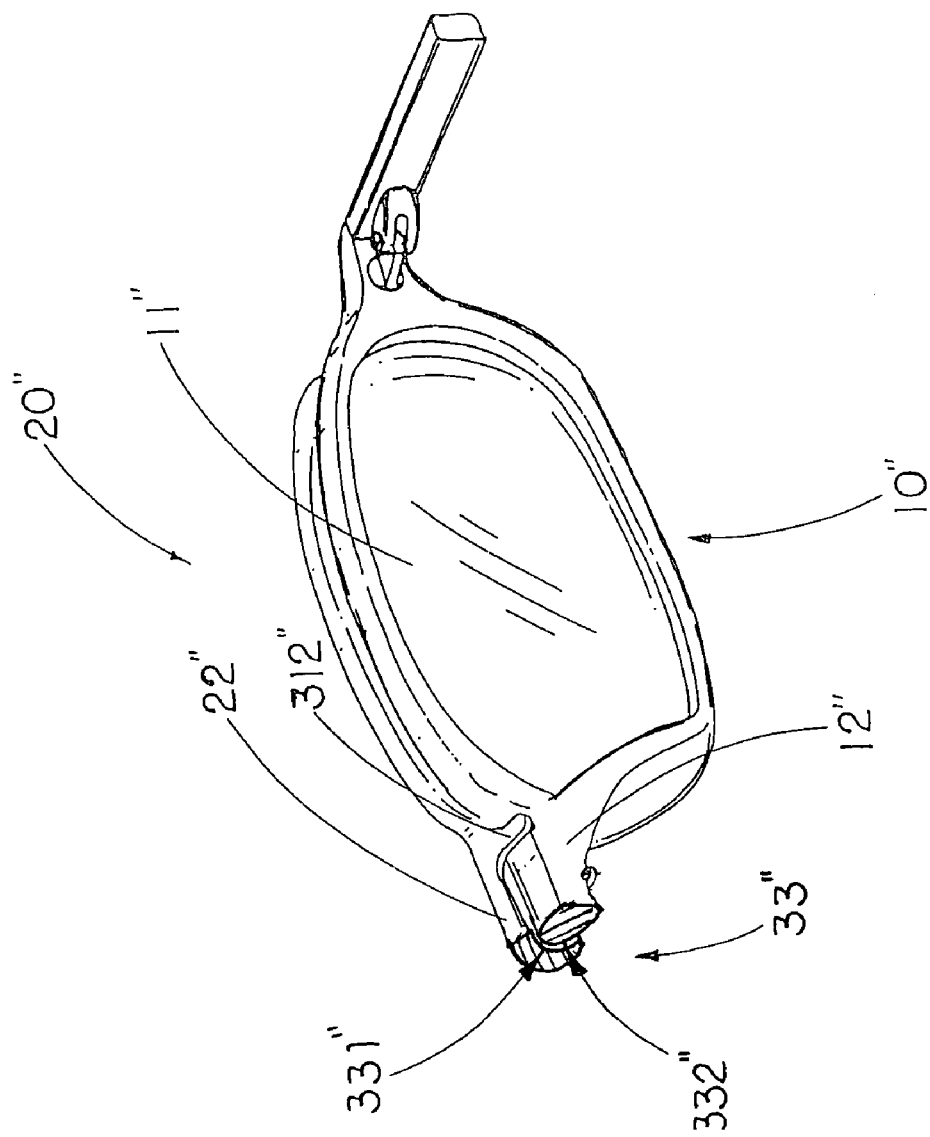
FIG. 18B is sectional perspective view of the first schematic diagram of the spectacles set according to the above third preferred embodiment of the present invention, illustrating the surface support of the detachable shelter frame and the plastic primary spectacles.

Referring to FIGS. 18A and 18B of the drawings, the primary spectacles 10" can be embodied as having a plastic spectacles frame forming, inter alia, the spectacles bridge 12", wherein the first and the second supporting members 311", 312" form two surface supports by inner surfaces thereof respectively, whereas the third supporting member 313" forms a surface support for the detachable shelter frame 20" at the position underneath the first and the second supporting members 311", 312".

In other words, the primary spectacles 10" further comprises a plastic frame 18" for holding the lenses 11" in position to form a widened plastic bridge as the primary bridge 12" therebetween, wherein the first supporting member 311" and the second or the third supporting members 312", 313" are substantially engaged with the upper and lower sides of the plastic bridge to mount the shelter frame 20" in front of the primary spectacles 10".

Figure 19A:
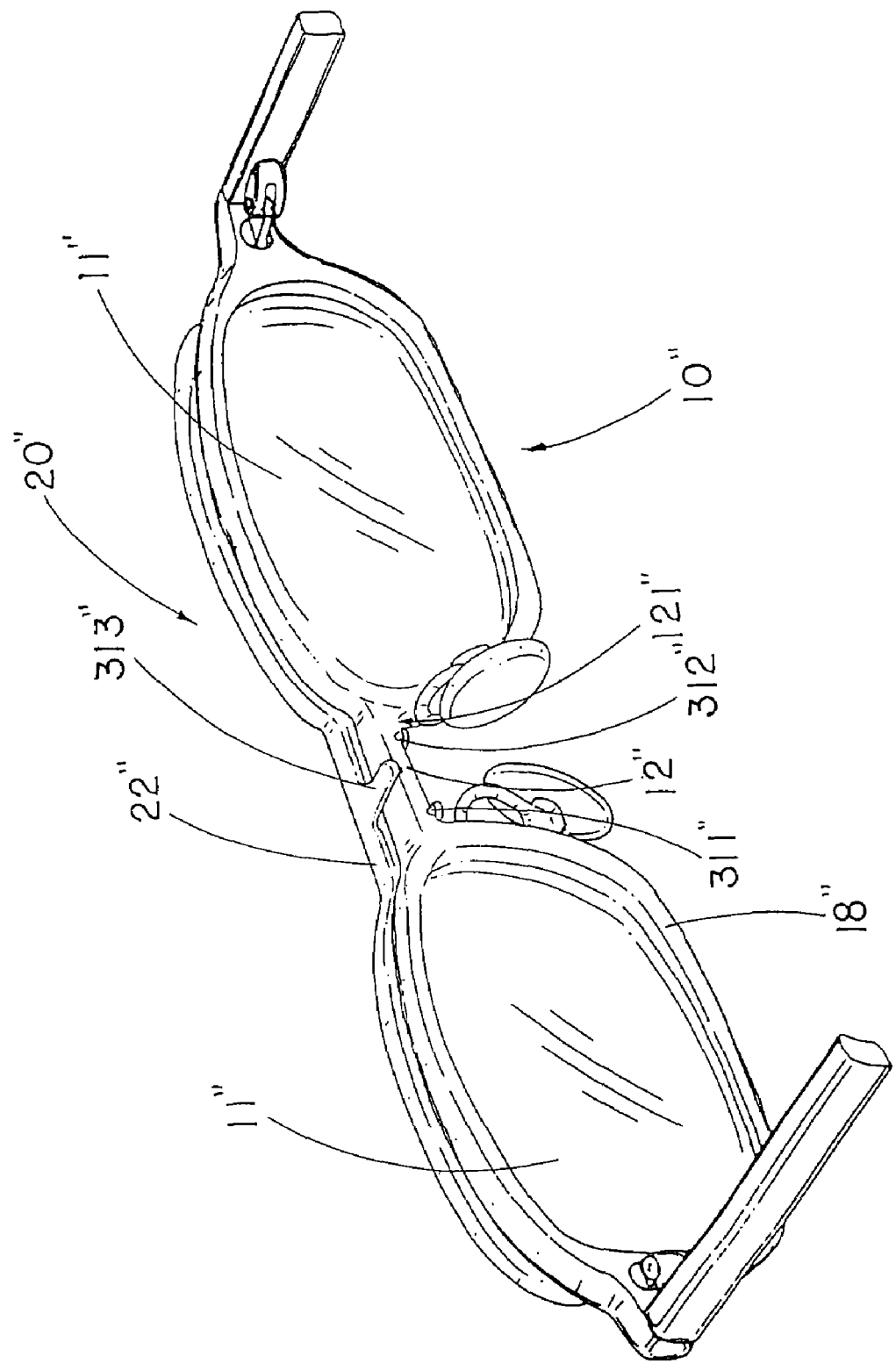
FIG. 19A is a second schematic diagram of the spectacles set according to the above third preferred embodiment of the present invention, illustrating that the primary spectacles have a plastic frame.
Figure 19B:
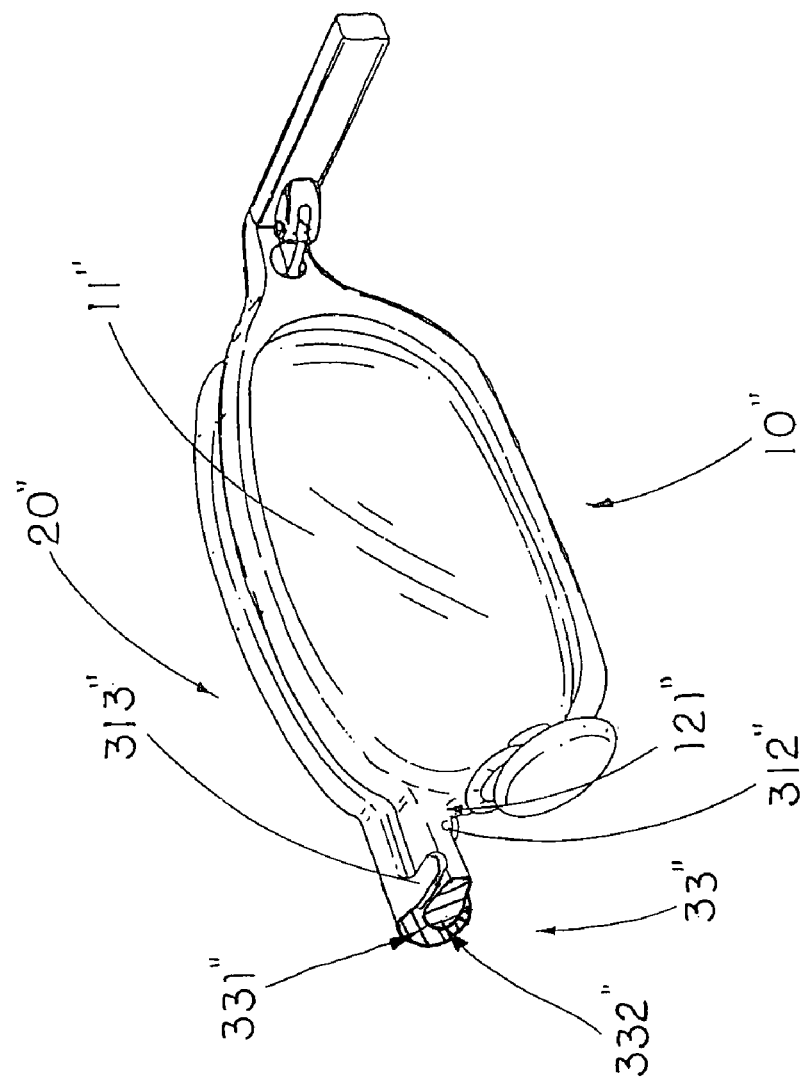
FIG. 19B is a sectional perspective view of the second schematic diagram of the spectacles set according to the above third preferred embodiment of the present invention, illustrating the surface support of the detachable shelter frame and the plastic primary spectacles.

As an obvious alternative to the supporting members 311", 312", 313", as shown in FIG. 19 of the drawings, the position of the first and the second supporting members 311", 312" and the third supporting members 313" may be interchanged so that the first and the second supporting members 311", 312" are extended from a bottom portion of the shelter bridge 22" while the third supporting member 313" is extended from the upper portion of the shelter bridge 22". In other words, the first through third supporting members 311", 312", 313" create the three-point support to the shelter frame 20" for ensuring secure engagement between the shelter bridge 22" and the primary bridge 12".

Thus, the primary spectacles 10" can also be embodied as having a plastic spectacles frame forming, inter alia, the spectacles bridge 12", wherein there two supporting members 311", 312" extended from the bottom portion of the shelter bridge 22", while the third supporting member 313" is extended from the upper portion of the shelter bridge 22".

Accordingly, the third supporting member 313" is substantially rest on the primary bridge 12" to support the detachable shelter frame 20" in front of the primary spectacles 10" while the first and second supporting members 311", 312" are engaged with a bottom side 121" of the primary bridge 12" to retain the detachable shelter frame 20" in position so as to securely mount the detachable shelter frame 20" in front of the primary spectacles frame 10" with the above-mentioned three-point support.

In such a situation, the length of the third supporting member 313" is longer than the length of the first and the second supporting members 311", 312". Moreover, the retention member 32" further comprises one more retention arm 321", wherein the two retention arms 321" are upwardly and integrally protruded from the first and the second supporting members 311", 312" to bias against the primary bridge 12".

Figure 12:
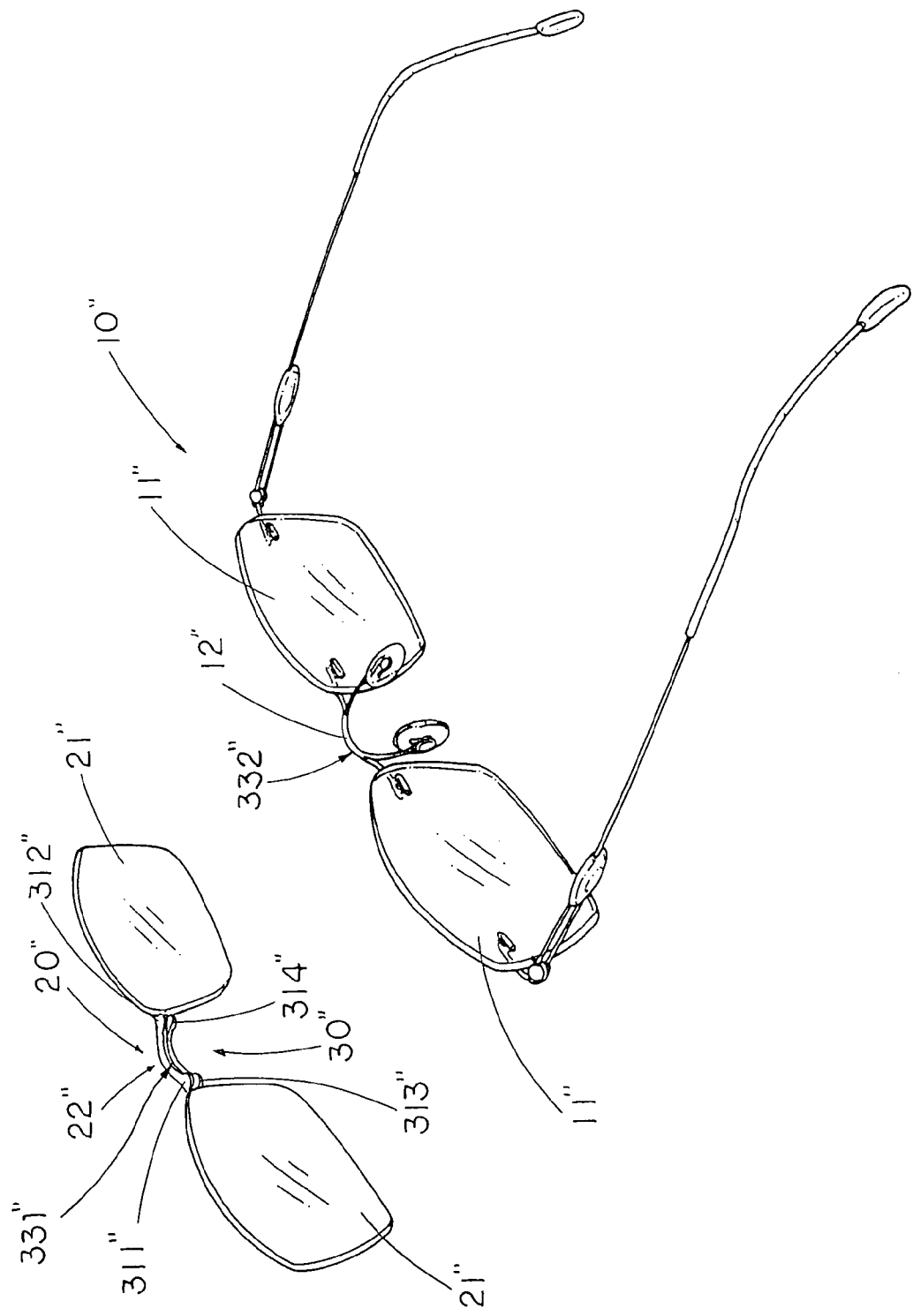
FIG. 12 is an alternative mode of the spectacles set according to the above third preferred embodiment of the present invention, illustrating that there are four supporting members extended from the shelter bridge of the detachable shelter frame.
Figure 20:
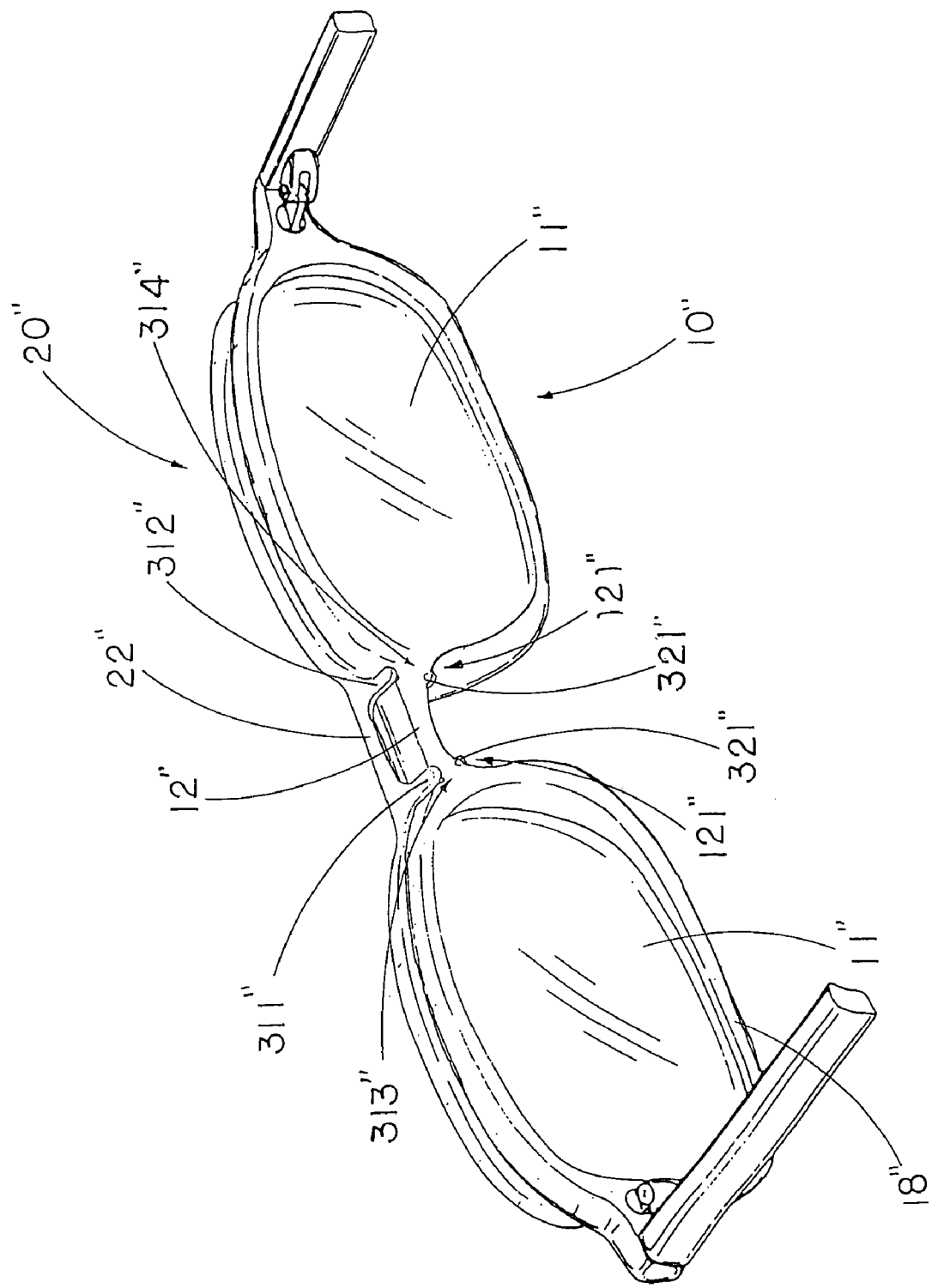
FIG. 20 is a third schematic diagram of the spectacles set according to the above third preferred embodiment of the present invention, illustrating that the primary spectacles have a plastic frame, while the detachable shelter frame comprises four supporting members for detachably attaching on the primary spectacles.
Figure 21A:
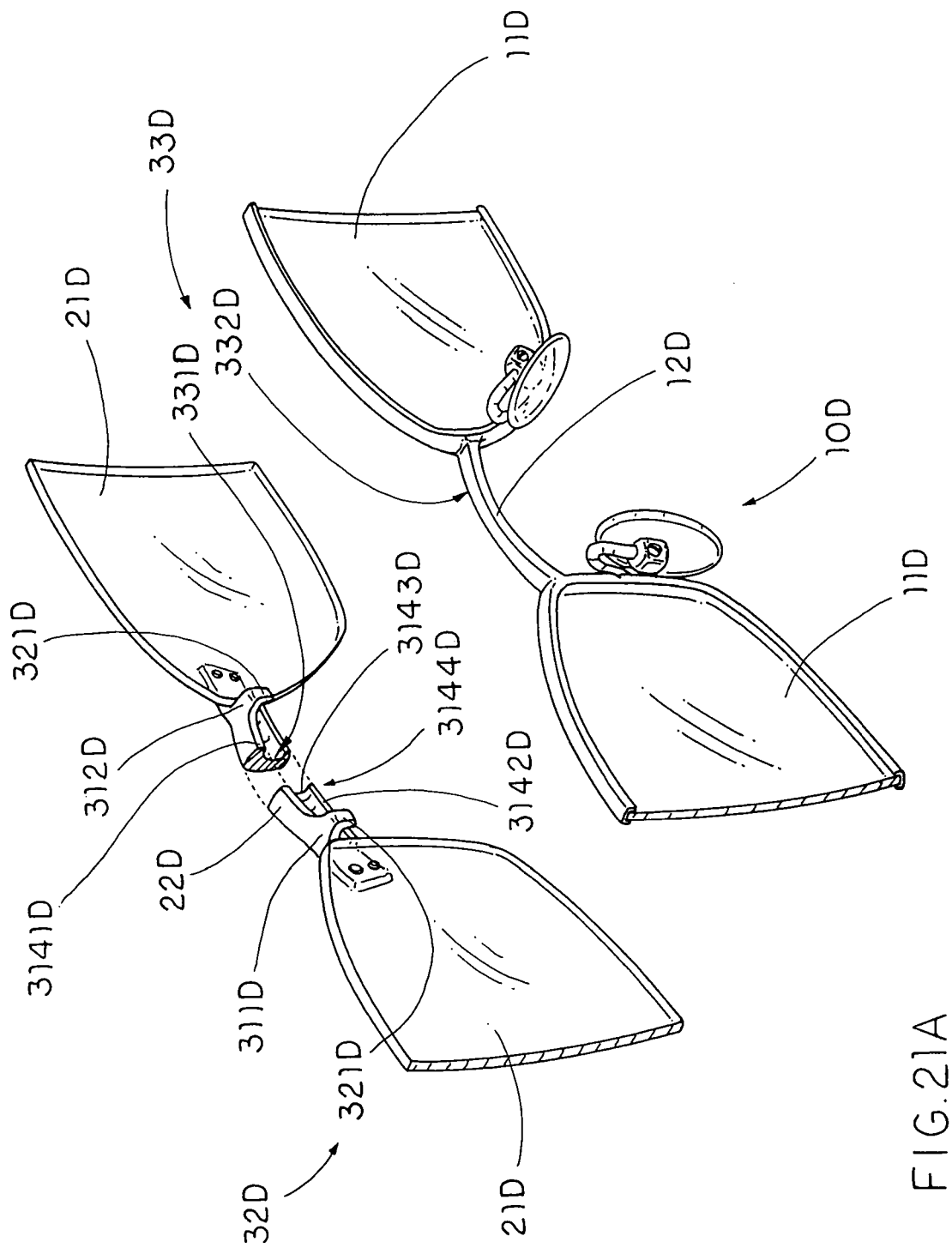
FIG. 21 is a schematic diagram of the spectacles set according to the above fourth preferred embodiment of the present invention.
Figure 21B:
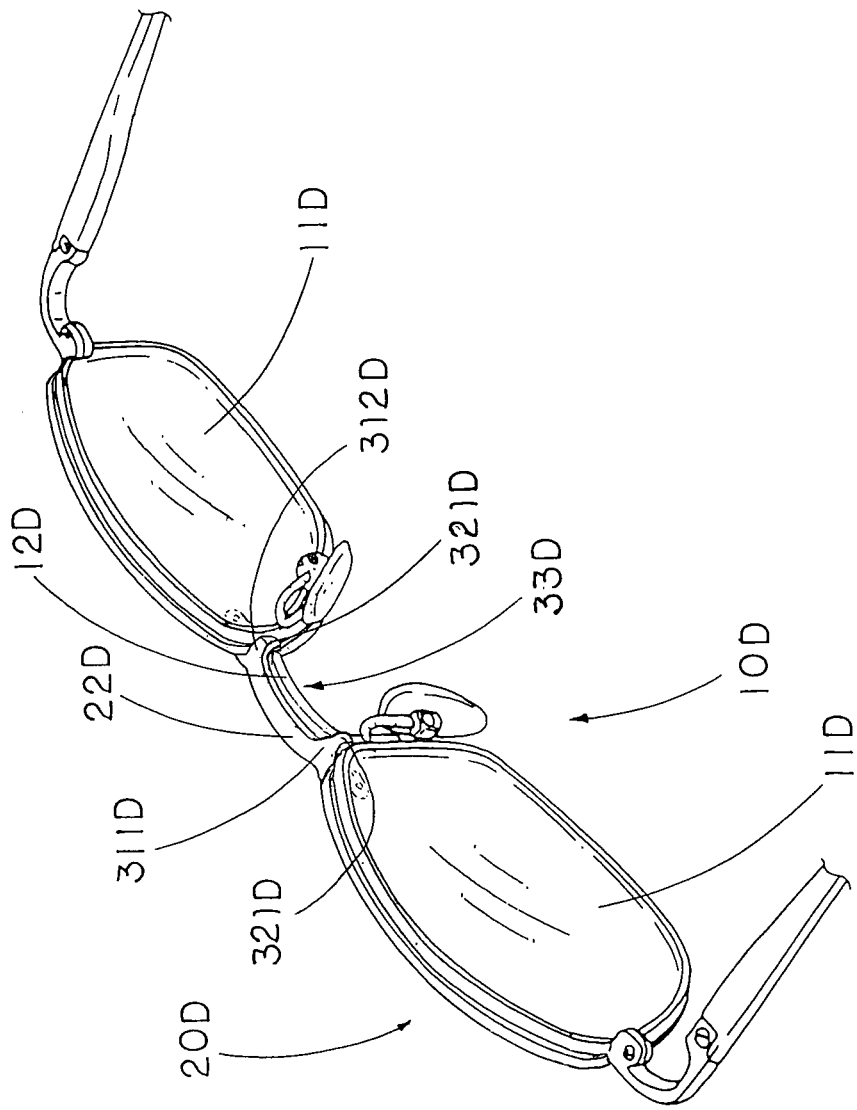
Figure 22:
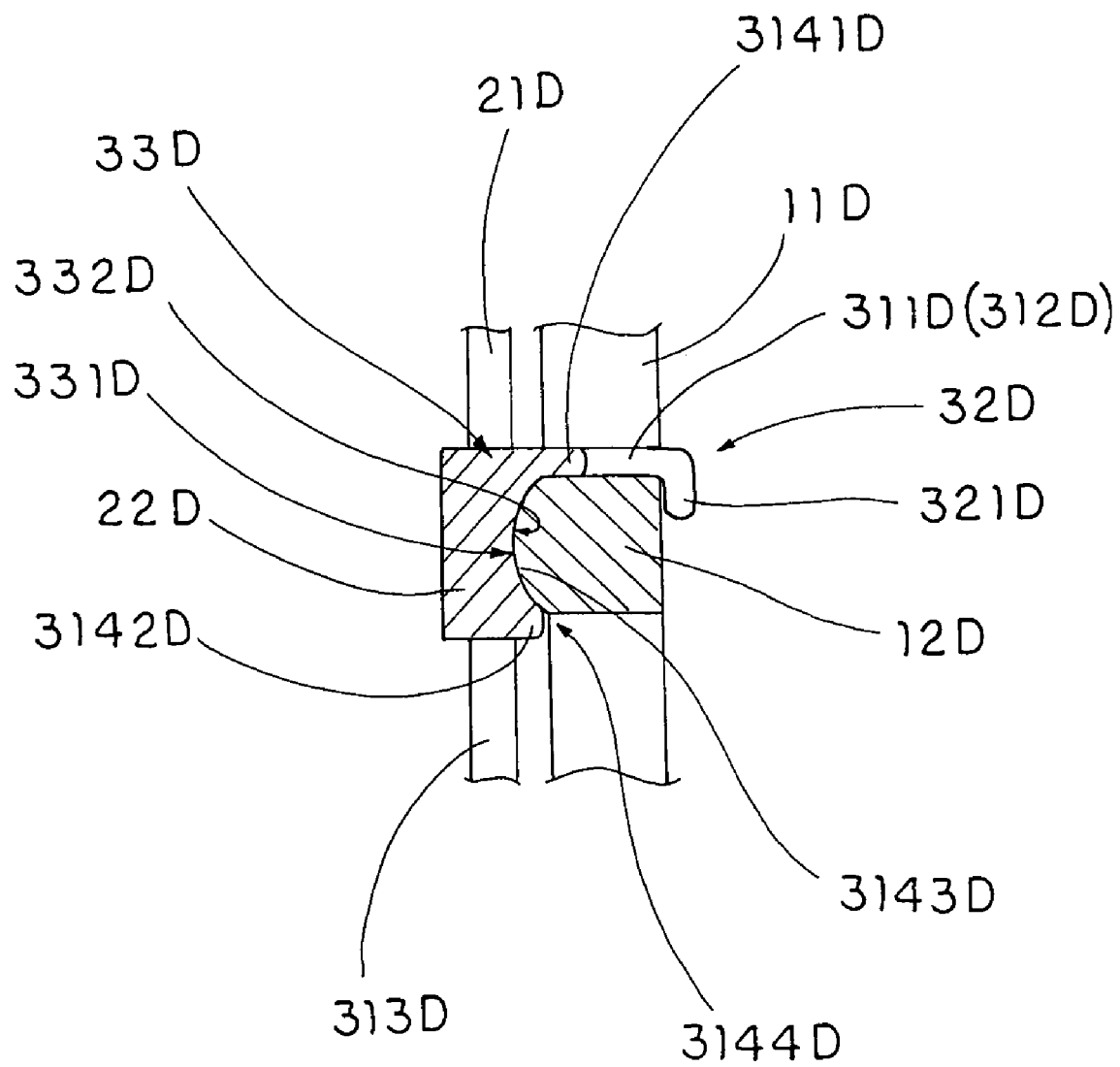
FIG. 22 is a sectional side view of a spectacles set according to the fourth preferred embodiment of the present invention.

Referring to FIG. 12 and FIG. 20 of the drawings, an alternative mode of the spectacles set according to the above third preferred embodiment of the present invention is illustrated. The alternative mode is similar to the third preferred embodiment except the mounting arrangement 30". According to the alternative mode, the mounting arrangement 30" further comprises a fourth supporting member 314" rearwardly extended from the upper portion of the shelter bridge 22" to engage with the primary bridge 12" in the similar fashion as the first supporting member 311".

In other words, the first though fourth supporting members 311", 312", 313", 314" provide a four-point support to the shelter frame 20", wherein the primary bridge 12" is arranged to engage with the shelter bridge 22" between the four supporting members 311", 312", 313", 314" in a balance manner so that the shelter frame 20" is capable of securely attaching on the primary spectacles 10".

As shown in FIG. 12 and FIG. 20 of the drawings, the first through four supporting members 311", 312", 313", 314" are rearwardly and integrally extended from four corner portions of the shelter bridge 22" respectively to engage with the primary bridge 12", wherein the first and the second supporting members 311", 312" are extended from the upper portion of the shelter bridge 22" while the third and the fourth supporting members 313", 314" are extended from the lower portion of the shelter bridge 22".

As a result, the two retention arms 321" are integrally and upwardly protruded from the third and the fourth supporting members 313", 314" bias against the bottom side 124" of the primary bridge 12".

Again, the first, second, third, fourth supporting members 311", 312", 313", 314" are preferably embodied as four flexible arms, wherein a gap between the first and third supporting members 311", 313", which is a gap between the second and fourth supporting members 312", 314", is slightly smaller than a height of the primary bridge 12" such that the first, second, third, and fourth supporting members 311", 312", 313", 314" provide an urging force against the primary bridge 12" when the shelter frame 20" is mounted in front of the primary spectacles 10".

Moreover, the primary bridge 12" has four corner engaging surfaces 121" formed at the upper and lower sides thereof at a position close to the two inner sides of the lenses 11" respectively, wherein the first, second, third and fourth supporting members 311", 312", 313", 314" are extended to substantially engage with the four side engaging surfaces 121" of the primary bridge 12" respectively to retain the detachable shelter frame 20" in position.

Referring to FIG. 13 to FIG. 15, and FIG. 21 to FIG. 22 of the drawings, a spectacles set according to a fourth preferred embodiment of the present invention is illustrated. According to the fourth preferred embodiment, the detachable shelter frame 20D comprises two shelter lenses 21D, a shelter bridge 22D extended between two inner sides of the shelter lenses 21D, and a mounting arrangement 30D comprising first and second supporting members 311D, 312D spacedly and rearwardly extended from the detachable shelter frame 20D to engage on the primary spectacles 10D so as to create two point supports for the shelter frame 20D while the shelter lenses 21D are aligning with the lenses 11D respectively. The mounting arrangement 30D further comprises a retention member 32D for applying an urging force to press the primary spectacles 10D towards the detachable shelter frame 20D, wherein the retention member 32D comprises first and second retention arms 321D downwardly extended from two distal ends of the first and second supporting members 311D, 312D to engage against a rear side of the primary bridge 12D for applying an urging force to press against the primary bridge 12D so as to engage the shelter bridge 22D with the primary bridge 12D when the detachable shelter frame 20D is mounted in front of the primary spectacles 10D so as to substantially retain the detachable shelter frame 20D in a balance manner.

According to the fourth preferred embodiment, the first and second supporting members 311D, 312D are rearwardly provided from the shelter bridge 22D wherein the first and the second supporting members 311D, 312D are rearwardly extended from two end portions of the shelter bridge 22D to engage with two end portions of the primary bridge 12D of the primary spectacles 10D. In other words, the two supporting members 311D, 312D provide two point supports for supporting the detachable shelter frame 20D to be mounted in front of the primary spectacles 10D.

In addition to the point supports provided by the first and second supporting members 311D, 312D, the mounting arrangement 30D further provides a surface support 33D to enhance the attachment between the detachable shelter frame 20D and the primary spectacles 10. The surface supports 33D has an elongated holding groove 331D indented along the rear side of the shelter bridge 22D of the detachable shelter frame 20D to receive a holding portion 332D protruded from a front side of the primary bridge 12D of the primary spectacles 10D, wherein the holding groove 331D of the shelter bridge 22D has an inwardly curved inner surface holding on an outwardly curved outer surface of the holding portion 332D of the primary bridge 12D. At the same time, the protruding holding portion 332D of the primary bridge 12D also substantially supports the shelter bridge 22D through the holding groove 331D. In other words, the surface support 33D enables the shelter bridge 22D to hold the primary bridge 12D together for better supporting the detachable shelter frame 20D in front of the primary spectacles 10D.

Figure 13:
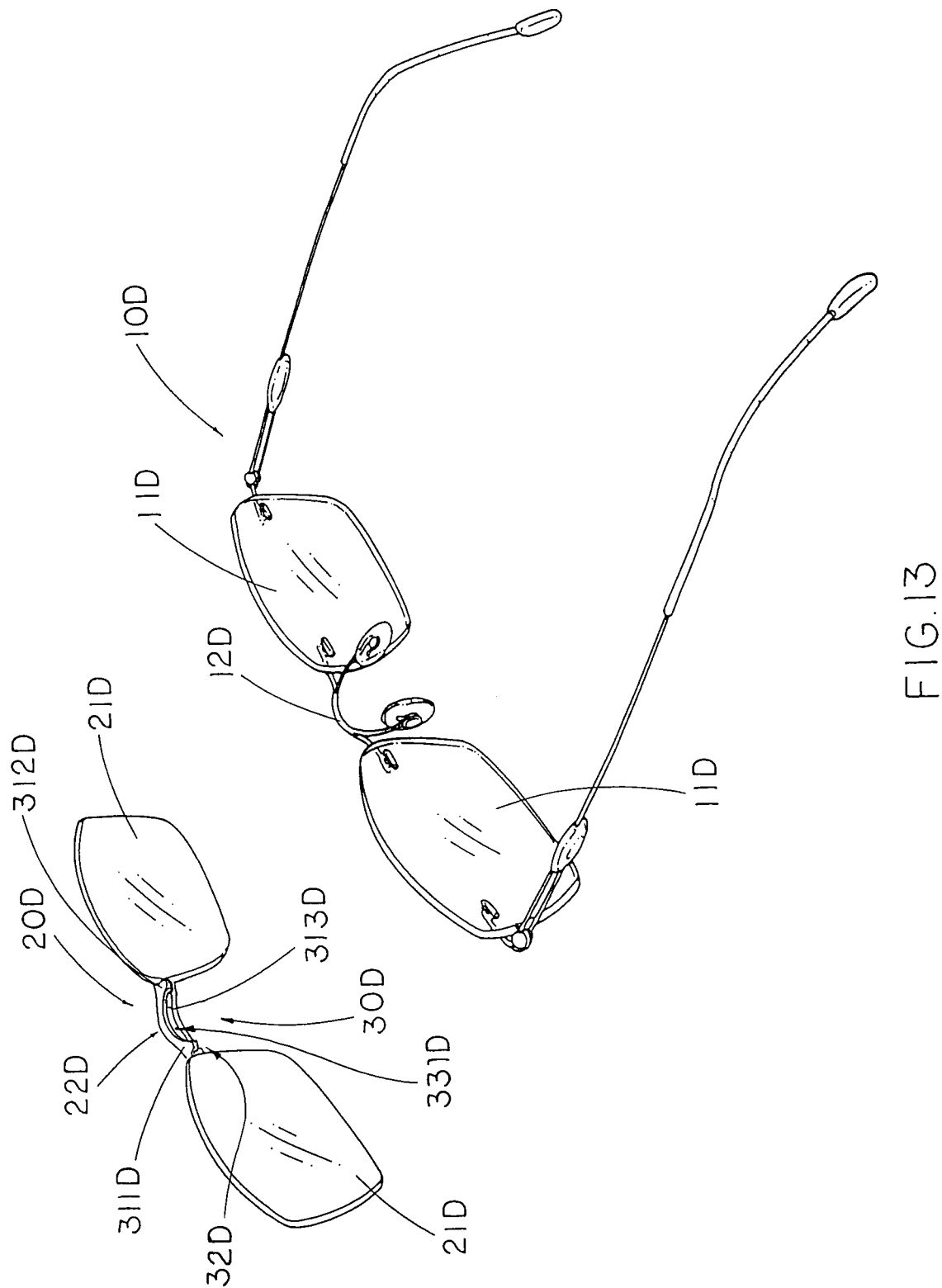
FIG. 13 is a perspective view of a spectacles set according to a fourth preferred embodiment of the present invention, illustrating that the shelter frame is detached on the primary spectacles.
Figure 14:
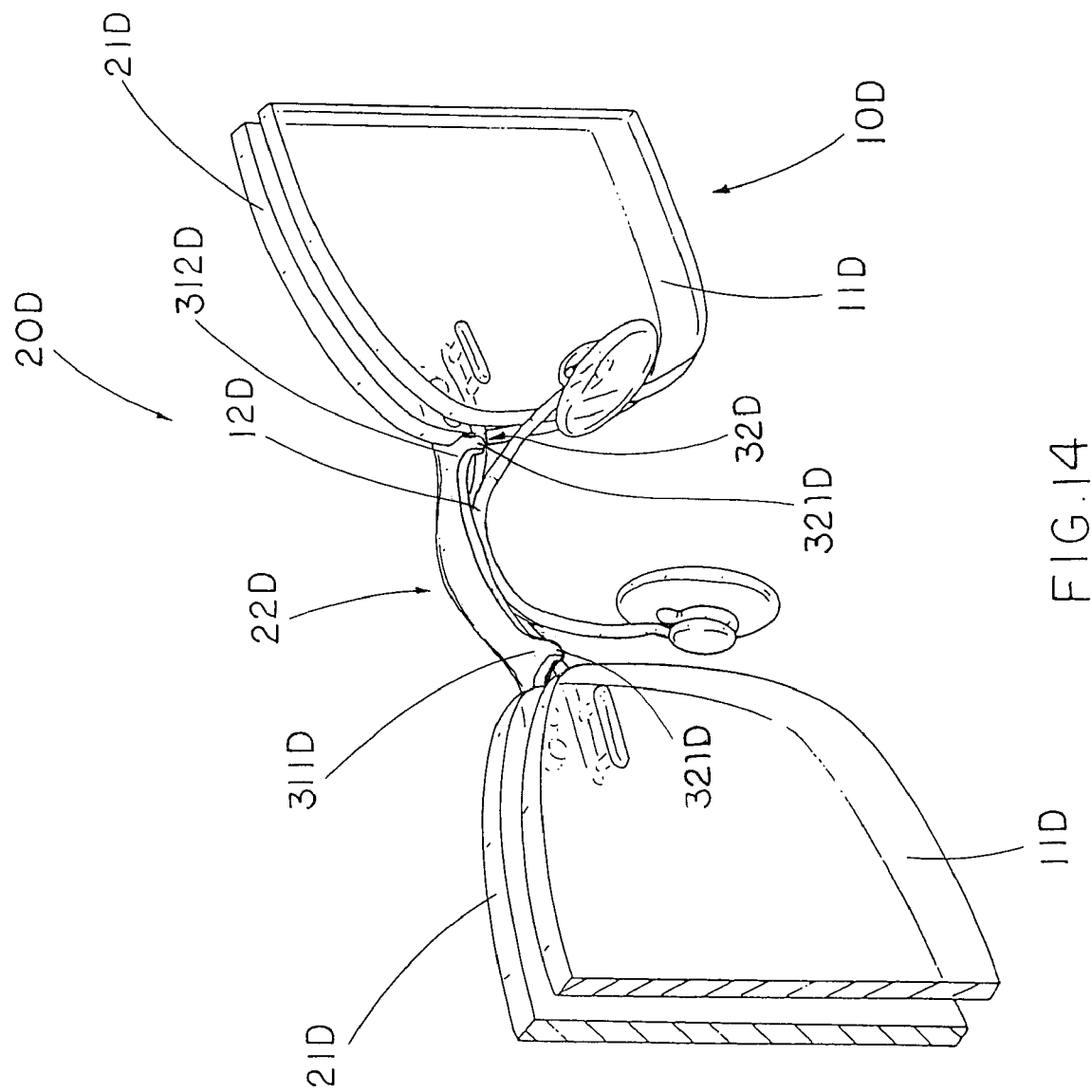
FIG. 14 is a perspective view of a spectacles set according to a fourth preferred embodiment of the present invention, illustrating that the shelter frame is attached on the primary spectacles.
Figure 15:
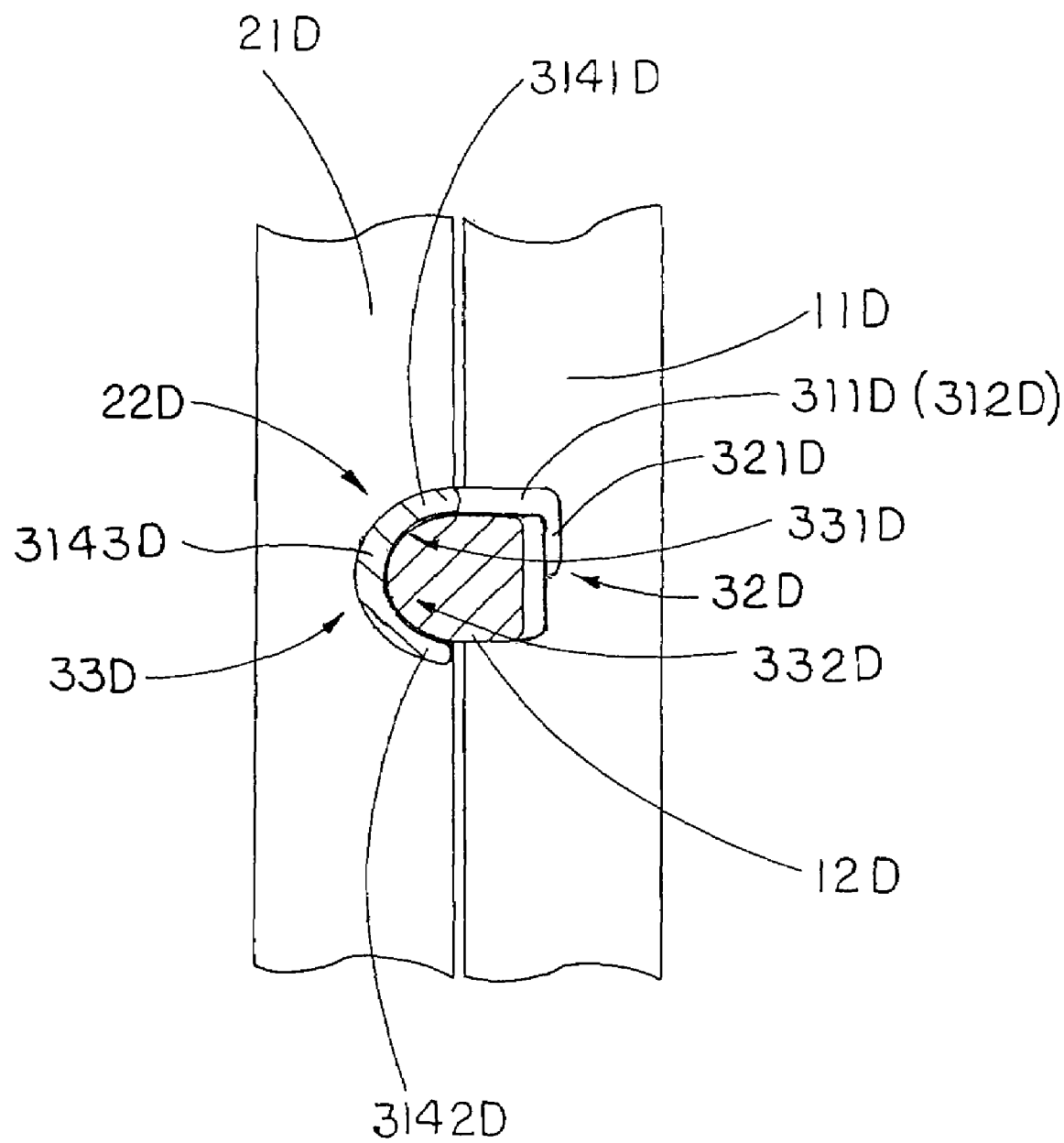
FIG. 15 is a sectional side view of the spectacles set according to the above fourth preferred embodiment of the present invention.

Referring to FIGS. 13 to 15 only, more specifically, the holding groove 331D is defined between a top supporting wall 3141D, a bottom supporting wall 3142D, and a side mounting wall 3143D of the central portion of the shelter bridge 22D, wherein the holding groove 331D extended between the two supporting members 311D, 312D has a C-shaped cross section as shown in FIG. 15 to receive and hold the C-shaped holding portion 332D of the primary bridge 12D in position.

Alternatively, as shown in FIG. 15, when the shelter bridge 22D according to the fourth preferred embodiment of the present invention is made of elastic materials, the distance between the top supporting wall 3141D and the bottom supporting wall 3142D can be made slightly smaller than a thickness of the holding portion 332D of the primary bridge 12D, wherein the shelter bridge 22D is capable of being slightly deformed upon pressing against the primary bridge 12D. As a result, the primary bridge 12D is adapted to be pressed into holding groove 331D by slightly stretching the top supporting wall 3141D and the bottom supporting wall 3142D and when the pressing force is released, the elastic nature of the shelter bridge 22D allows it to return to its original shape.

It is worth mentioning that the first and the second supporting member 311D", 312D" may be rearwardly extended from two outer sides of the shelter lenses 21D to ride on the side extensions of the primary spectacles 10D, as shown in FIG. 15 of the drawings.

Figure 16:
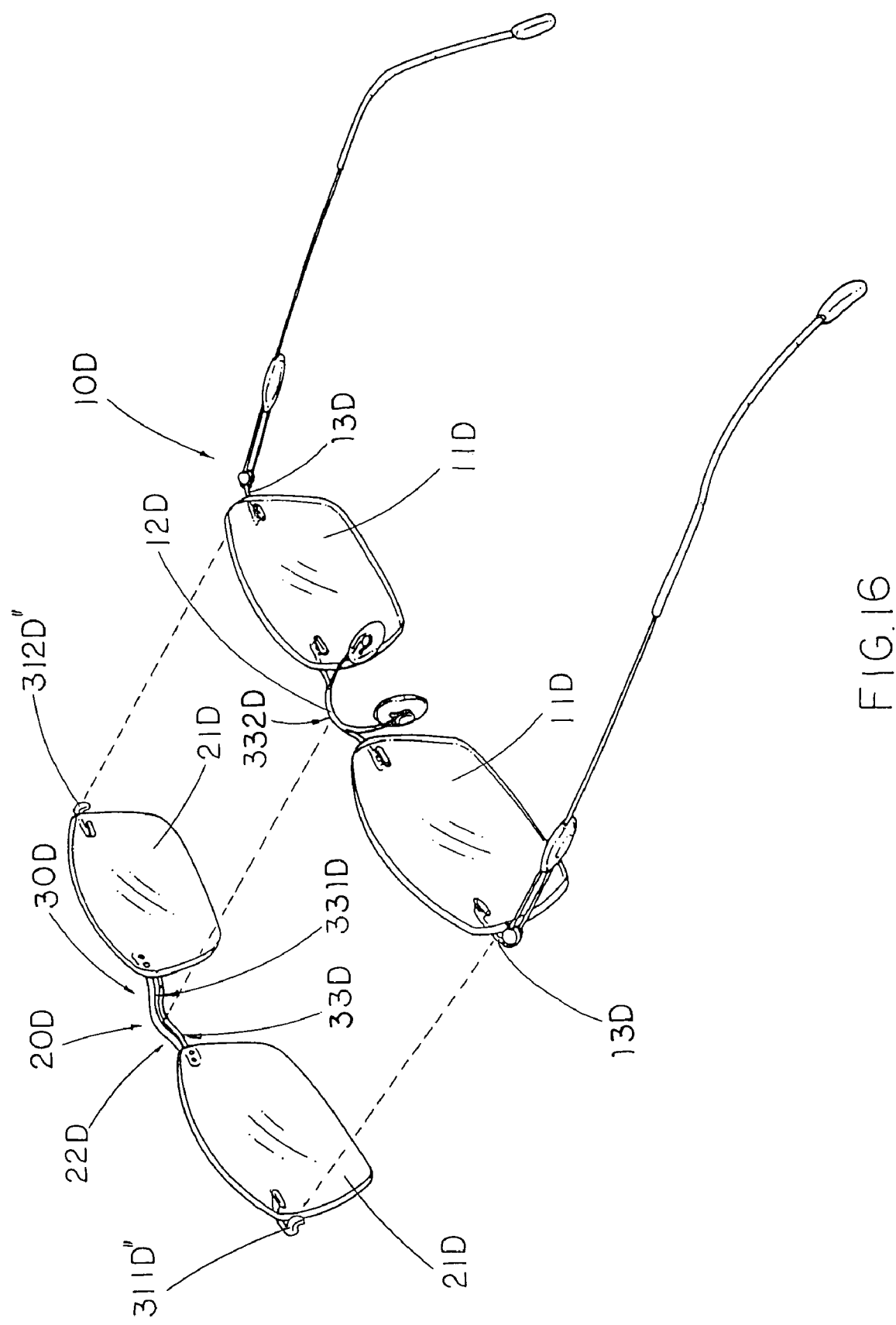
FIG. 16 is a perspective view of the spectacles set according to the above fourth preferred embodiment of the present invention, illustrating that the first and the second supporting members are extended from two outer sides of the shelter lenses.

Referring to FIG. 16 of the drawings, the fourth embodiment as shown in FIGS. 13 to 15 is modified to provide the supporting members 311D and 312D to two outer sides of the two lenses 21D of the detachable shelter frame 20D for engaging with two side extensions 13D of the primary spectacles 10D while the elongated holding groove 331D of the surface support 33D is provided in the rear side of the shelter bridge 22D for holding and supporting the holding portion 332D of the primary bridge 12D of the primary spectacles 10D.

Figure 17:
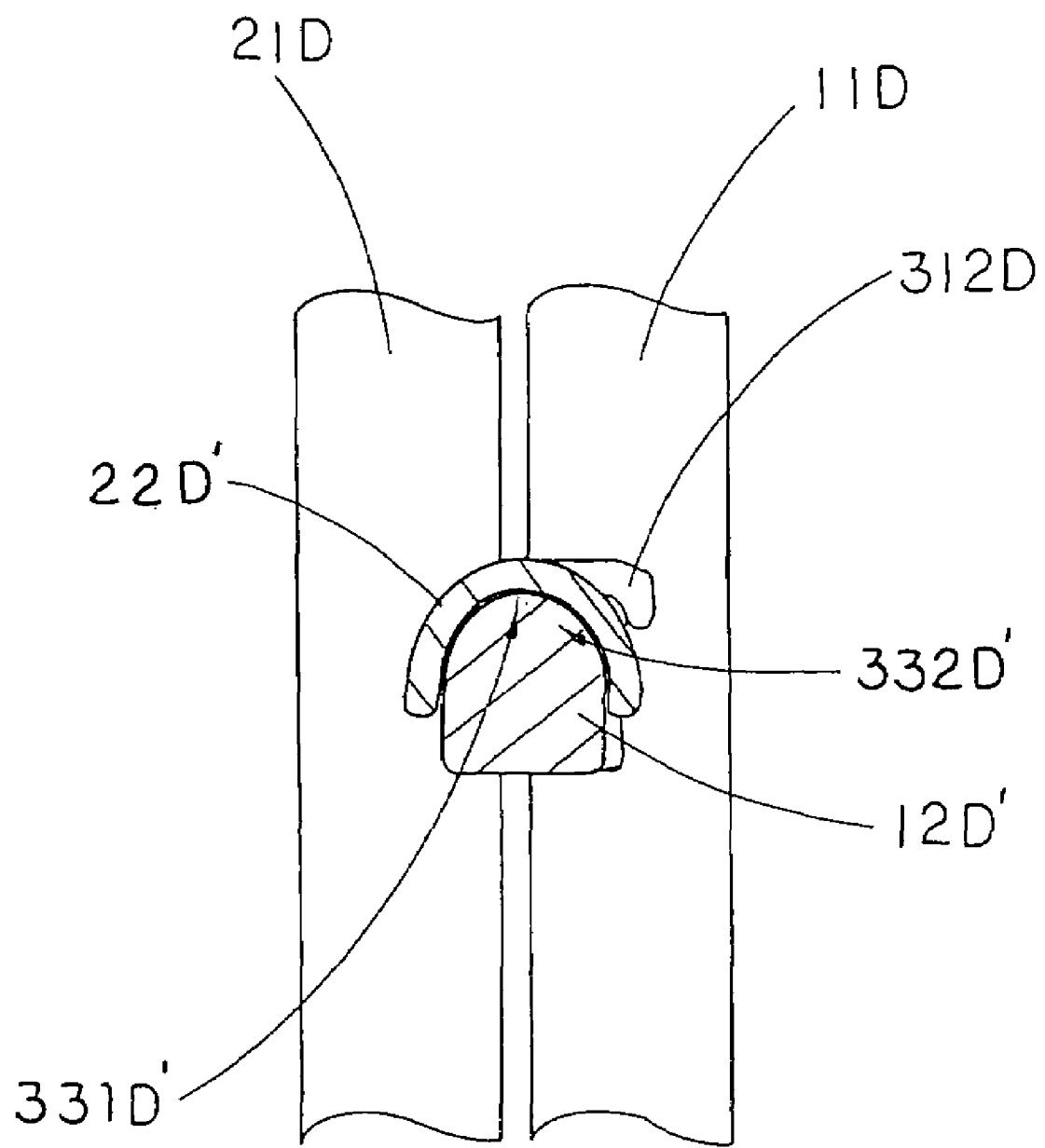
FIG. 17 is a first alternative mode of the spectacles set according to the above fourth preferred embodiment of the present invention.

Referring to FIG. 17 of the drawings, a first alternative mode of the spectacles set according to the fourth preferred embodiment of the present invention is illustrated. The second alternative mode is similar to the fourth preferred embodiment except the C-shaped holding groove 331D' of the shelter bridge 22D' and the C-shaped holding portion 332D' of the primary bridge 12D', wherein holding portion 332D' is formed on a top side of the primary bridge 12D' and the holding groove 331D' is indented along a bottom side of the shelter bridge 22D' for fittingly holding on a mid-portion of a top side of the primary bridge 12D, i.e. the holding portion 332D', wherein the shelter bridge 22D substantially rests on the primary bridge 12D to support the detachable shelter frame 20D in front of the primary spectacles 10D.

Figure 23:
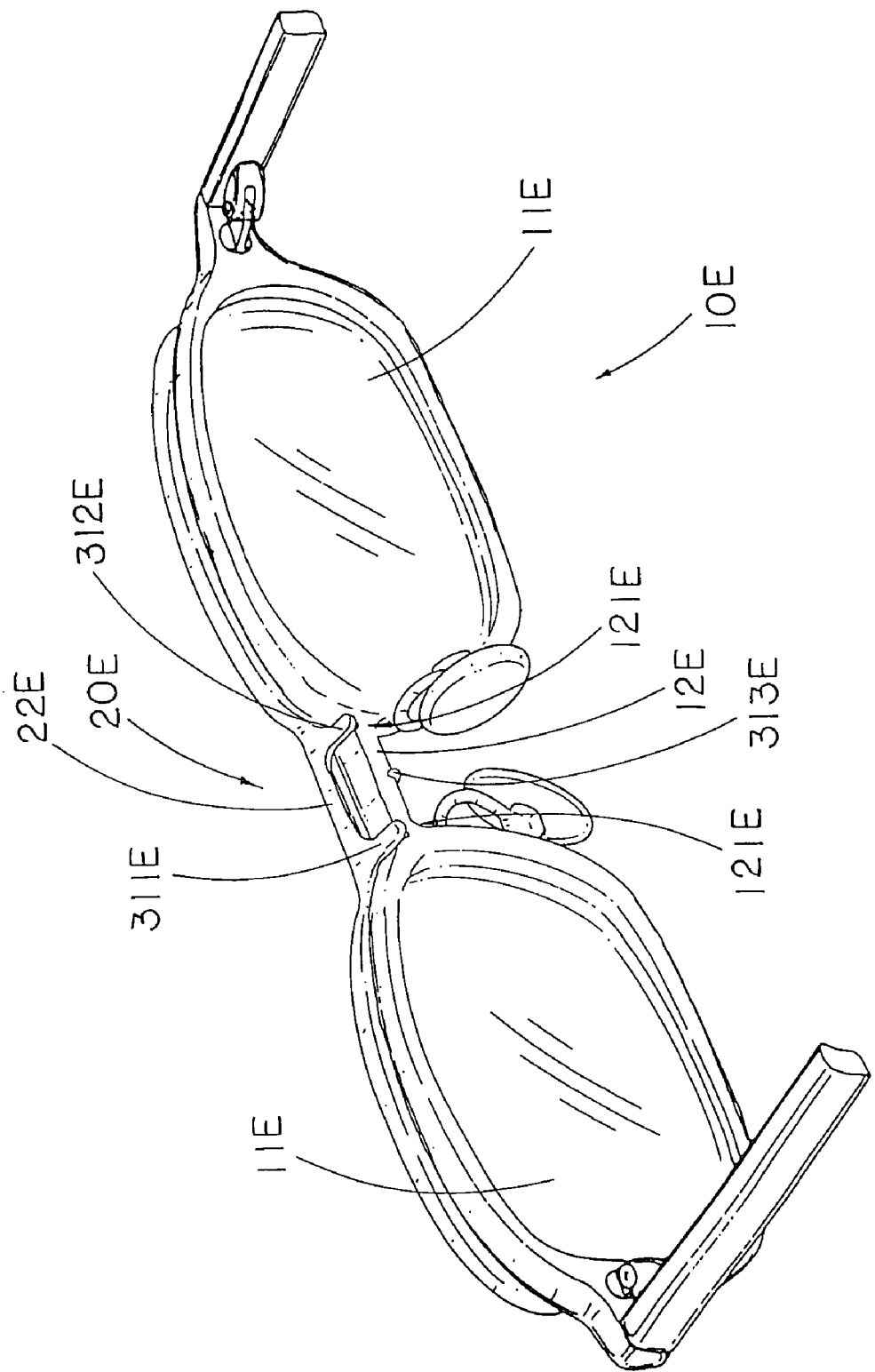
FIG. 23 is a sectional side view of the spectacles set according to the above fifth preferred embodiment of the present invention.

Referring to FIG. 23 of the drawings, the spectacles set according to a fifth preferred embodiment of the present invention is illustrated. The fifth preferred embodiment is similar to the first preferred embodiment except the detachable shelter frame 20E.

According to the fifth preferred embodiment, the detachable shelter frame 20E comprises two shelter lenses 21, a shelter bridge 22E extended between two inner sides of the shelter lenses 21, and a mounting arrangement 30E comprising first through third supporting members 311E, 312E, 313E spacedly and rearwardly extended from the shelter bridge 22E to engage on the primary bridge 12E so as to support the shelter frame 20E in a balanced manner while the shelter lenses 21 is aligning with the lenses 11E respectively.

The first and the second supporting member 311E, 312E are rearwardly extended from an upper portion of the shelter bridge 22E while the third supporting member 313E is rearwardly extended from a lower portion of the shelter bridge 22E, wherein the first though third supporting members 311E, 312E, 313E are substantially rest on the primary bridge 12E to support the detachable shelter frame 20E in front of the primary spectacles 10E so as to retain the detachable shelter frame 20E in position for securely mounting the detachable shelter frame 20E in front of the primary spectacles frame 10E with the three-point support.

According to the fifth preferred embodiment of the present invention, the first, second and third supporting members 311E, 312E, 313E are three flexible arms, wherein a gap between the first and third supporting members 311E, 312E is slightly smaller than a height of the primary bridge 12E such that the first, second and third supporting members 311E, 312E, 313E provide an urging force against the primary bridge 12E when the shelter frame 20E is mounted in front of the primary spectacles 10E.

In order to facilitate a more secure attachment between the primary spectacles 10E and the detachable shelter frame 20E, the primary bridge 12E has two corner engaging surfaces 121 formed at the lower side thereof at a position close to the two inner sides of the lenses 11E respectively, wherein the second and third supporting members 312E, 313E are extended to substantially engage with the two side engaging surfaces 121 of the primary bridge 12E respectively to retain the detachable shelter frame 20E in position.

As an obvious alternative to the supporting members 311E, 312E, 313E, the position of the first and the second supporting members 311E, 312E and the third supporting members 313E may be interchanged so that the first and the second supporting members 311E, 312E are extended from a bottom portion of the shelter bridge 22E while the third supporting member 313E is extended from the upper portion of the shelter bridge 22E.

It is worth mentioning that the spectacles frame 10E in the fifth preferred embodiment is made of metallic materials and having a widened primary bridge 12E so that the detachable shelter frame 20E is capable of attaching on the primary spectacles 10E.

Figure 24:
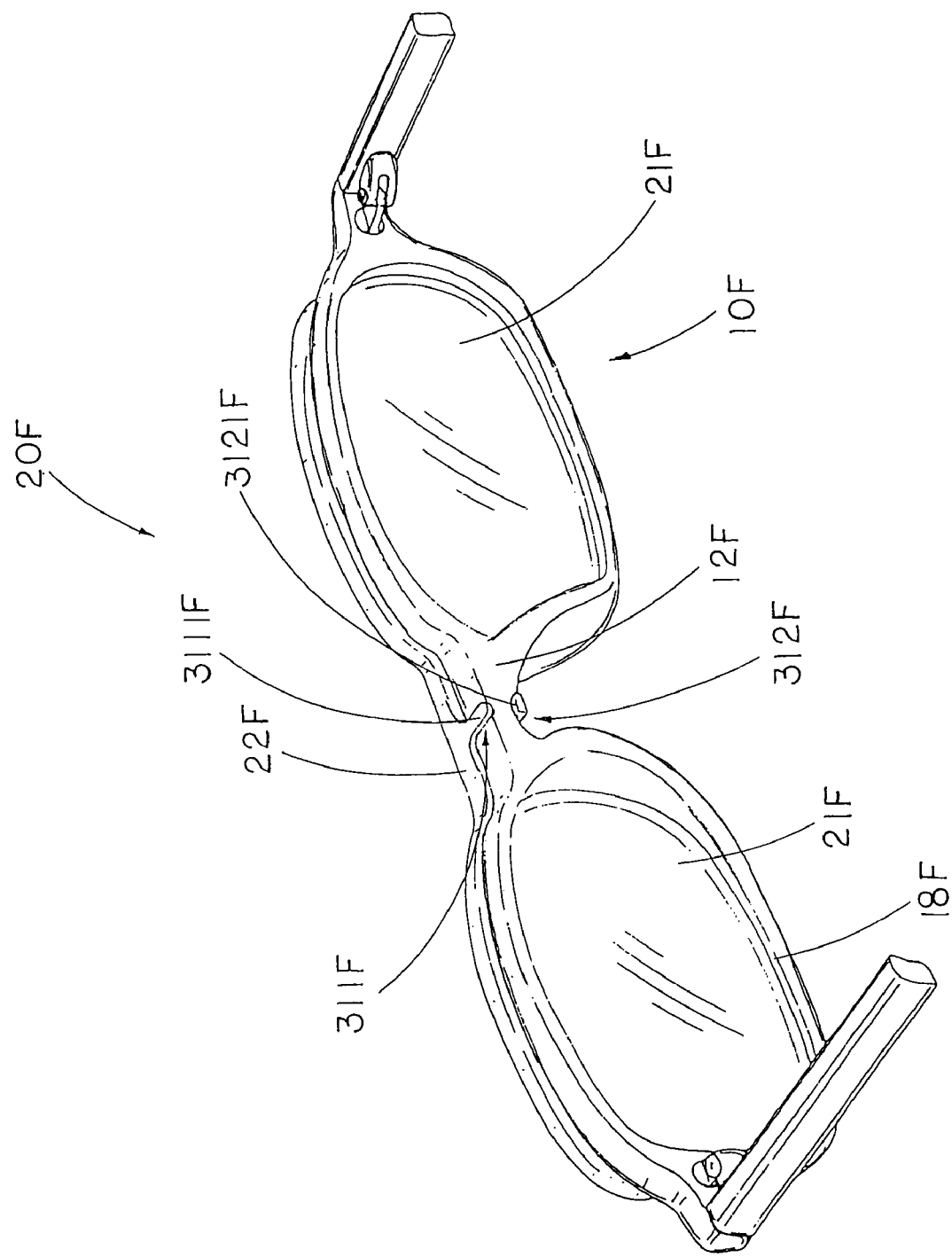
FIG. 24 is a perspective view of a spectacles set according to a sixth preferred embodiment of the present invention, illustrating that the shelter frame is attached on the primary spectacles.
Figure 25:
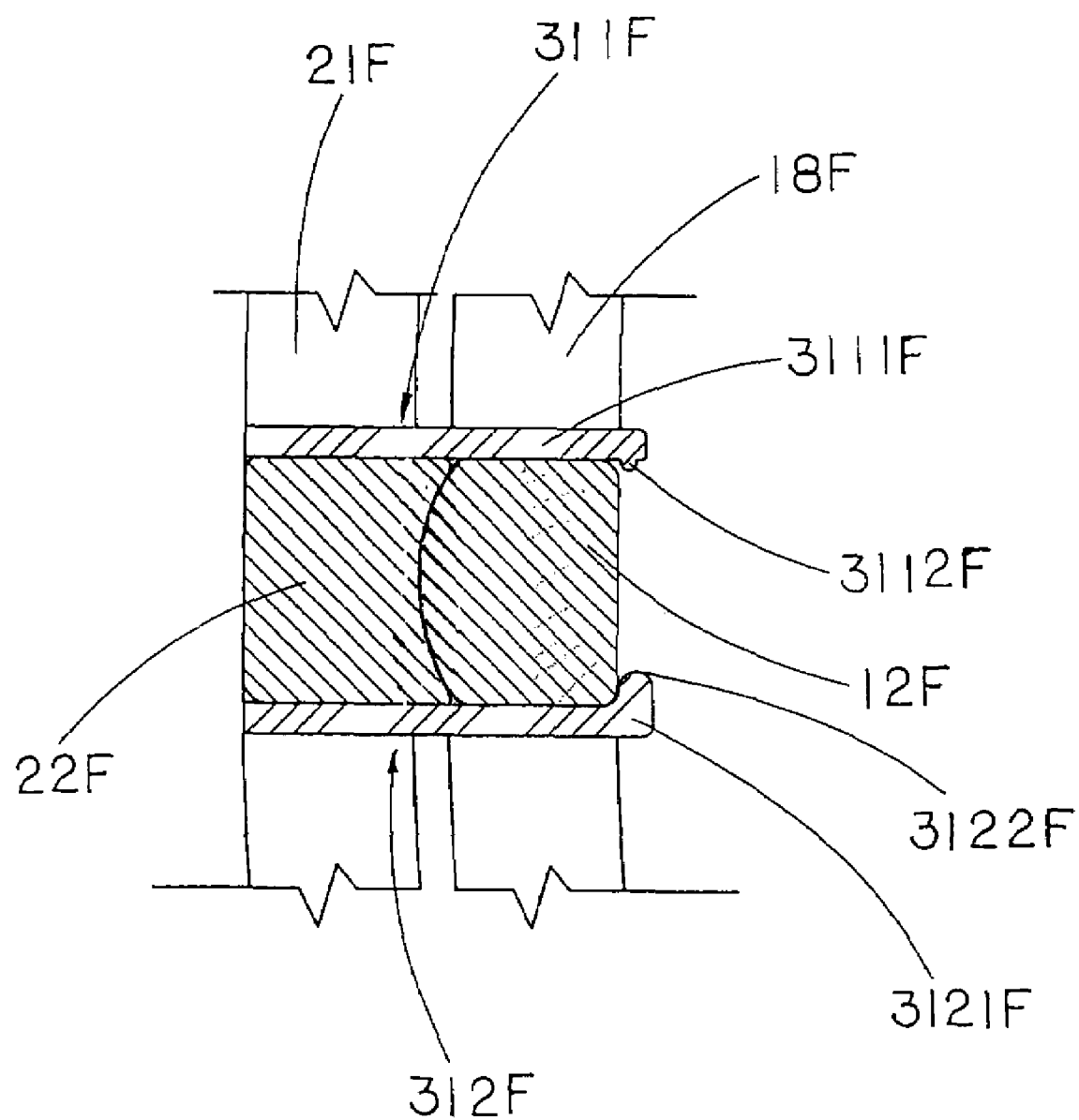
FIG. 25 is a sectional side view of the spectacles set according to the above sixth preferred embodiment of the present invention.

Referring to FIG. 24 of the drawings, the spectacles set according to a sixth preferred embodiment of the present invention is illustrated. The sixth preferred embodiment is similar to the first preferred embodiment except the detachable shelter frame 20F.

The detachable shelter frame 20F comprises two shelter lenses 21F, a shelter bridge 22F extended between two inner sides of the shelter lenses 21F, and a mounting arrangement 30F comprising first through second supporting members 311F, 312F spacedly and rearwardly extended from an upper portion and a lower portion of the shelter bridge 22F respectively to engage on the primary bridge 12F so as to support the shelter frame 20F in a balanced manner while the shelter lenses 21F is aligning with the lenses 11F respectively.

The first supporting member 311F comprises an engaging member 3111F, having an engaging tip 3112F, rearwardly extended from the shelter bridge 22F to engage with the upper side of the primary bridge 12F at a position that the engaging tip 3112F is coupled at a top rear edge of the primary bridge 12F, wherein the second supporting member 312F comprises a hooking member 3121F, having a hooking tip 3122F, rearwardly extended from the shelter bridge 22F to engage with the lower side of the primary bridge 12F at a position that the hooking tip 3122F is coupled at a rear side of the primary bridge 12F.

It is worth mentioning that a width of the hooking member 3121F is larger than a width of the engaging member 3111F to define a retention surface on the hooking member 3121F to engage with the lower side of the primary bridge 12F when the detachable shelter frame 20F is mounted in front of the primary spectacles 10F.

As a slight alternative, the mounting arrangement 30 may comprise first through third supporting members 311F, 312F, 313 spacedly and rearwardly extended from the shelter bridge 22F respectively to engage on the primary bridge 12F so as to support the shelter frame 20F in a balanced manner while the shelter lenses 21F is aligning with the lenses 11F respectively.

According to the seventh preferred embodiment of the present invention, each of the supporting members 311F, 312F, 313 is embodied as three engaging hooks rearwardly extended from the shelter bridge 22F to engage with the shelter bridge 22F so as to substantially retain the detachable shelter frame 20F on the primary spectacles 10F.

As a result, the three supporting members 311F, 312F, 313 form a three-point support to the detachable shelter frame 20F on the primary spectacles 10F so that the detachable shelter frame 20F can be retained on the primary spectacles 10F in the balanced manner.

As an alternative, it is also important to point out that the primary spectacles 311G further comprises a metal spectacles frame 18F for holding the lenses 11F in position to form a widened metal bridge as the primary bridge 12F therebetween, wherein the first and second supporting members 311F, 312F are substantially engaged with the upper and lower sides of the metal bridge to mount the shelter frame 20F in front of the primary spectacles 10F. Of course, the spectacles frame 18F may also be a plastic frame having a widened primary bridge 18F.

It is important to point out that any combination of the above-mentioned preferred embodiments is obviously covered by the spirit of the present invention. For example, the position of the first and the second supporting members 311, 312 can be interchanged.

Figure 26:
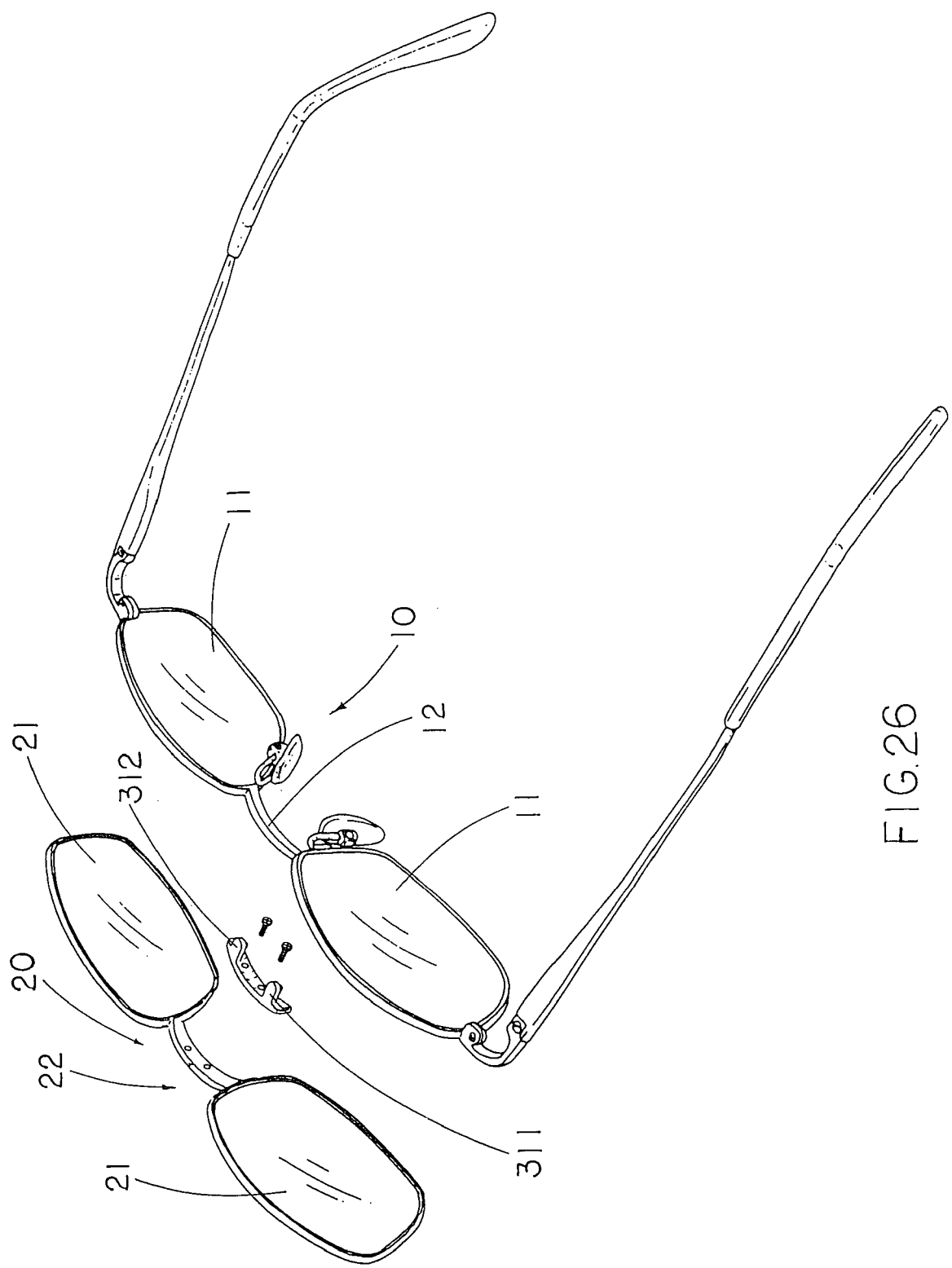
FIG. 26 is a schematic diagram of the spectacles set of the present invention.

Referring to FIG. 26 of the drawings, it is worth mentioning that the detachable shelter frame 20 of the present invention is conveniently manufactured by assembling the plastic-made supporting members 311, 312 to the detachable shelter frame 20 for forming the shelter bridge 22.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A spectacles set, comprising a primary spectacles and a detachable shelter frame adapted for detachably mounting in front of said primary spectacles, wherein:

said primary spectacles comprises two lenses, a primary bridge extended between two inner sides of said lenses respectively, and a pair of temples coupling at two outer sides of said lenses respectively; and said detachable shelter frame comprises two shelter lenses, a shelter bridge extended between two inner sides of said shelter lenses, and a mounting arrangement comprising one or more point supports and a surface support provided on said detachable shelter frame for mounting said detachable shelter frame on said primary spectacles, wherein at least one of said point support and said surface support is formed at said shelter bridge to engage with said primary bridge for detachably support said shelter frame to mount in front of said primary spectacles in a balanced manner, wherein said surface support of said mounting arrangement has a holding groove indented on said shelter bridge of said detachable shelter frame to receive a holding portion protruded from said primary bridge of said primary spectacles to form said surface support of the mounting arrangement, wherein said holding groove of said shelter bridge has an inner surface holding on an outer surface of said holding portion of said primary bridge while said holding portion of said primary bridge supporting said shelter bridge through said holding groove thereof, therefore said surface support enables said shelter bridge to hold said primary bridge together for enhancing an attachment of said detachable shelter frame in front of said primary spectacles, wherein said mounting arrangement comprises first and second supporting members, wherein said first and second supporting members are flexible arms rearwardly extended from said shelter bridge and each of said flexible arms has a retention arm downwardly extended for applying an urging force against said primary bridge for engaging said supporting members with said primary bridge for supporting said detachable shelter frame in front of said primary spectacles.

2. A spectacles set, comprising a primary spectacles and a detachable shelter frame adapted for detachably mounting in front of said primary spectacles, wherein:

said primary spectacles comprises two lenses, a primary bridge extended between two inner sides of said lenses respectively, and a pair of temples coupling at two outer sides of said lenses respectively; and said detachable shelter frame comprises two shelter lenses, a shelter bridge extended between two inner sides of said shelter lenses, and a mounting arrangement comprising one or more point supports and a surface support provided on said detachable shelter frame for mounting said detachable shelter frame on said primary spectacles, wherein at least one of said point support and said surface support is formed at said shelter bridge to engage with said primary bridge for detachably support said shelter frame to mount in front of said primary spectacles in a balanced manner, wherein said mounting arrangement comprises first and second supporting members spacedly provided on said shelter bridge of said detachable shelter frame for mounting on said primary bridge of said primary spectacles respectively as said point supports of said shelter frame with respect to said primary spectacles, so as to detachably support said shelter frame in front of said primary spectacles in a balanced manner, wherein said surface support of said mounting arrangement has a holding groove indented on said shelter bridge of said detachable shelter frame to receive a holding portion protruded from said primary bridge of said primary spectacles to form said surface support of the mounting arrangement, wherein said holding groove of said shelter bridge has an inner surface holding on an outer surface of said holding portion of said primary bridge while said holding portion of said primary bridge supporting said shelter bridge through said holding groove thereof, therefore said surface support enables said shelter bridge to hold said primary bridge together for enhancing an attachment of said detachable shelter frame in front of said primary spectacles, wherein said first and second supporting members are flexible arms rearwardly extended from said shelter bridge and each of said flexible arms has a retention arm downwardly extended for applying an urging force against said primary bridge for engaging said supporting members with said primary bridge for supporting said detachable shelter frame in front of said primary spectacles.

3. A spectacles set, comprising a primary spectacles and a detachable shelter frame adapted for detachably mounting in front of said primary spectacles, wherein:

said primary spectacles comprises two lenses, a primary bridge extended between two inner sides of said lenses respectively, and a pair of temples coupling at two outer sides of said lenses respectively; and said detachable shelter frame comprises two shelter lenses, a shelter bridge extended between two inner sides of said shelter lenses, and a mounting arrangement comprising one or more point supports and a surface support provided on said detachable shelter frame for mounting said detachable shelter frame on said primary spectacles, wherein at least one of said point support and said surface support is formed at said shelter bridge to engage with said primary bridge for detachably support said shelter frame to mount in front of said primary spectacles in a balanced manner, wherein said mounting arrangement comprises first and second supporting members spacedly provided on said shelter bridge of said detachable shelter frame for mounting on said primary bridge of said primary spectacles respectively as said point supports of said shelter frame with respect to said primary spectacles, so as to detachably support said shelter frame in front of said primary spectacles in a balanced manner, wherein said first and second supporting members are mounted on an upper side and a lower side of said primary bridge and said mounting arrangement further comprises a third supporting member and a fourth supporting member, wherein said third supporting member is provided on said shelter bridge of said detachable shelter frame to mount on said lower side of said primary bridge at a position spaced apart from said second supporting member, wherein said fourth supporting member is provided on said shelter bridge of said detachable shelter frame to mount on said upper side of said primary bridge at a position spaced apart from said first supporting member to form a third and a fourth point support of said shelter frame for detachably supporting said shelter frame in front of said primary spectacles, wherein each of said supporting members is a L-shaped flexible arm rearwardly extended from said shelter bridge to form a retention arm for applying an urging force against said primary bridge for engaging said supporting members with said primary bridge for supporting said detachable shelter frame in front of said primary spectacles.

4. A spectacles set, comprising a primary spectacles and a detachable shelter frame adapted for detachably mounting in front of said primary spectacles, wherein:

said primary spectacles comprises two lenses, a primary bridge extended between two inner sides of said lenses respectively, and a pair of temples coupling at two outer sides of said lenses respectively; and said detachable shelter frame comprises two shelter lenses, a shelter bridge extended between two inner sides of said shelter lenses, and a mounting arrangement comprising one or more point supports and a surface support provided on said detachable shelter frame for mounting said detachable shelter frame on said primary spectacles, wherein at least one of said point support and said surface support is formed at said shelter bridge to engage with said primary bridge for detachably support said shelter frame to mount in front of said primary spectacles in a balanced manner, wherein said surface support of said mounting arrangement has a holding groove indented on said shelter bridge of said detachable shelter frame to receive a holding portion protruded from said primary bridge of said primary spectacles to form said surface support of the mounting arrangement, wherein said holding groove of said shelter bridge has an inner surface holding on an outer surface of said holding portion of said primary bridge while said holding portion of said primary bridge supporting said shelter bridge through said holding groove thereof, therefore said surface support enables said shelter bridge to hold said primary bridge together for enhancing an attachment of said detachable shelter frame in front of said primary spectacles, wherein said mounting arrangement comprises first and second supporting members, wherein said first and second supporting members are mounted on an upper side and a lower side of said primary bridge and said mounting arrangement further comprises a third supporting member and a fourth supporting member, wherein said third supporting member is provided on said shelter bridge of said detachable shelter frame to mount on said lower side of said primary bridge at a position spaced apart from said second supporting member, wherein said fourth supporting member is provided on said shelter bridge of said detachable shelter frame to mount on said upper side of said primary bridge at a position spaced apart from said first supporting member to form a third and a fourth point support of said shelter frame for detachably supporting said shelter frame in front of said primary spectacles, wherein each of said supporting members is a L-shaped flexible arm rearwardly extended from said shelter bridge to form a retention arm for applying an urging force against said primary bridge for engaging said supporting members with said primary bridge for supporting said detachable shelter frame in front of said primary spectacles.

5. A spectacles set, comprising a primary spectacles and a detachable shelter frame adapted for detachably mounting in front of said primary spectacles, wherein:

said primary spectacles comprises two lenses, a primary bridge extended between two inner sides of said lenses respectively, and a pair of temples coupling at two outer sides of said lenses respectively; and said detachable shelter frame comprises two shelter lenses, a shelter bridge extended between two inner sides of said shelter lenses, and a mounting arrangement comprising one or more point supports and a surface support provided on said detachable shelter frame for mounting said detachable shelter frame on said primary spectacles, wherein at least one of said point support and said surface support is formed at said shelter bridge to engage with said primary bridge for detachably support said shelter frame to mount in front of said primary spectacles in a balanced manner, wherein said mounting arrangement comprises first and second supporting members spacedly provided on said shelter bridge of said detachable shelter frame for mounting on said primary bridge of said primary spectacles respectively as said point supports of said shelter frame with respect to said primary spectacles, so as to detachably support said shelter frame in front of said primary spectacles in a balanced manner, wherein said surface support of said mounting arrangement has a holding groove indented on said shelter bridge of said detachable shelter frame to receive a holding portion protruded from said primary bridge of said primary spectacles to form said surface support of the mounting arrangement, wherein said holding groove of said shelter bridge has an inner surface holding on an outer surface of said holding portion of said primary bridge while said holding portion of said primary bridge supporting said shelter bridge through said holding groove thereof, therefore said surface support enables said shelter bridge to hold said primary bridge together for enhancing an attachment of said detachable shelter frame in front of said primary spectacles, wherein said first and second supporting members are mounted on an upper side and a lower side of said primary bridge and said mounting arrangement further comprises a third supporting member and a fourth supporting member, wherein said third supporting member is provided on said shelter bridge of said detachable shelter frame to mount on said lower side of said primary bridge at a position spaced apart from said second supporting member, wherein said fourth supporting member is provided on said shelter bridge of said detachable shelter frame to mount on said upper side of said primary bridge at a position spaced apart from said first supporting member to form a third and a fourth point support of said shelter frame for detachably supporting said shelter frame in front of said primary spectacles, wherein each of said supporting members is a L-shaped flexible arm rearwardly extended from said shelter bridge to form a retention arm for applying an urging force against said primary bridge for engaging said supporting members with said primary bridge for supporting said detachable shelter frame in front of said primary spectacles.

* * * * *